(12) United States Patent
Rovik et al.

(10) Patent No.: US 8,594,861 B2
(45) Date of Patent: Nov. 26, 2013

(54) SYSTEMS AND METHODS FOR COMMUNICATING WITH A VEHICLE USER

(75) Inventors: Christopher Lee Rovik, Canton, MI (US); Charan S. Lota, Canton, MI (US); Donald Anthony Restauri, III, Ypsilanti, MI (US); Tuhin Diptiman, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/405,516

(22) Filed: Feb. 27, 2012

(65) Prior Publication Data

US 2013/0226371 A1    Aug. 29, 2013

(51) Int. Cl.
   *G05D 1/00*   (2006.01)
   *G05D 3/00*   (2006.01)
   *G06F 7/00*   (2006.01)
   *G06F 17/00*  (2006.01)

(52) U.S. Cl.
   USPC .......................................................... 701/2

(58) Field of Classification Search
   USPC ................................................... 701/2, 200
   See application file for complete search history.

(56) References Cited

U.S. PATENT DOCUMENTS

| | | |
|---|---|---|
| 4,046,998 A | 9/1977 | Kuno et al. |
| 4,217,644 A | 8/1980 | Kato et al. |
| 4,590,568 A | 5/1986 | Barske et al. |
| 5,508,930 A | 4/1996 | Smith |
| 5,608,635 A | 3/1997 | Tamai |
| 5,648,768 A | 7/1997 | Bouve |
| 5,790,973 A | 8/1998 | Blaker et al. |
| 5,804,810 A | 9/1998 | Woolley et al. |
| 6,216,086 B1 | 4/2001 | Seymour et al. |
| 6,278,940 B1 | 8/2001 | Endo |
| 6,401,029 B1 | 6/2002 | Kubota et al. |
| 6,429,773 B1 | 8/2002 | Schuyler |
| 6,493,649 B1 | 12/2002 | Jones et al. |
| 6,510,381 B2 | 1/2003 | Grounds et al. |
| 6,580,981 B1 | 6/2003 | Masood et al. |
| 6,775,603 B2 | 8/2004 | Yester et al. |
| 6,775,613 B2 | 8/2004 | Burt et al. |
| 6,839,614 B1 | 1/2005 | Timko et al. |
| 6,844,827 B2 | 1/2005 | Flick |
| 6,871,141 B2 | 3/2005 | Volkel |
| 6,975,938 B2 | 12/2005 | Odagawa et al. |
| 6,996,469 B2 | 2/2006 | Lau et al. |

(Continued)

OTHER PUBLICATIONS

USPTO Non-Final Office Action issued Oct. 25, 2012 for U.S. Appl. No. 13/406,463—9 pages.

(Continued)

*Primary Examiner* — Mary Cheung
*Assistant Examiner* — Frederick Brushaber
(74) *Attorney, Agent, or Firm* — Dinsmore & Shohl LLP

(57) ABSTRACT

Included are systems and methods for communicating with a vehicle user. One embodiment includes obtaining a user preference and authorization information relating to a mobile phone device and third party information, recognizing the particular user upon approach with the mobile phone device and implementing the user preference for the particular user, the user preference comprising a setting for a functional aspect of the vehicle and a setting for a non-functional aspect of the vehicle. Some embodiments include providing, by the vehicle computing device, customized interactive communication with the particular user, based on stored user preferences and third party information.

20 Claims, 23 Drawing Sheets

(56) References Cited

U.S. PATENT DOCUMENTS

| | | |
|---|---|---|
| 7,084,767 B2 | 8/2006 | Hasegawa et al. |
| 7,139,660 B2 | 11/2006 | Sarkar et al. |
| 7,233,861 B2 | 6/2007 | Van Buer et al. |
| 7,433,782 B2 | 10/2008 | Operowsky et al. |
| 7,598,868 B2 | 10/2009 | Lee et al. |
| 7,599,792 B1 | 10/2009 | Smith |
| 7,668,653 B2 | 2/2010 | Habaguchi et al. |
| 7,702,454 B2 | 4/2010 | Nesbitt |
| 7,733,228 B2 | 6/2010 | Lee et al. |
| 7,761,350 B1 | 7/2010 | Ridgeway |
| 7,778,769 B2 | 8/2010 | Boss et al. |
| 7,834,762 B2 | 11/2010 | Danvir et al. |
| 7,881,838 B2 | 2/2011 | Larschan et al. |
| 7,937,075 B2 | 5/2011 | Zellner |
| 7,999,664 B2 | 8/2011 | Barajas |
| 2004/0128066 A1 | 7/2004 | Kudo et al. |
| 2004/0236504 A1 | 11/2004 | Bickford et al. |
| 2006/0241862 A1 | 10/2006 | Ichihara et al. |
| 2007/0010942 A1 | 1/2007 | Bill |
| 2007/0016362 A1* | 1/2007 | Nelson .................. 701/200 |
| 2007/0208861 A1* | 9/2007 | Zellner et al. ............ 709/227 |
| 2008/0287121 A1* | 11/2008 | Ebrom et al. ............ 455/426.1 |
| 2009/0079555 A1 | 3/2009 | Aguirre De Carcer et al. |
| 2009/0088965 A1 | 4/2009 | Burckart et al. |
| 2009/0240427 A1 | 9/2009 | Siereveld et al. |
| 2009/0289776 A1 | 11/2009 | Moore et al. |
| 2010/0082246 A1 | 4/2010 | Crane |
| 2010/0102953 A1 | 4/2010 | Chau et al. |
| 2010/0114478 A1 | 5/2010 | Bai |
| 2010/0191454 A1 | 7/2010 | Shirai et al. |
| 2010/0198508 A1 | 8/2010 | Tang |
| 2010/0222939 A1 | 9/2010 | Namburu et al. |
| 2010/0280711 A1 | 11/2010 | Chen et al. |
| 2010/0308986 A1 | 12/2010 | Dobryden et al. |
| 2011/0137470 A1 | 6/2011 | Surnilla et al. |
| 2011/0137520 A1 | 6/2011 | Rector et al. |
| 2011/0137773 A1 | 6/2011 | Davis et al. |
| 2011/0153141 A1 | 6/2011 | Beechie et al. |
| 2011/0153148 A1 | 6/2011 | Edwards et al. |
| 2011/0208646 A1 | 8/2011 | McMaster et al. |
| 2011/0231310 A1 | 9/2011 | Roberts et al. |
| 2011/0238289 A1 | 9/2011 | Lehmann et al. |

OTHER PUBLICATIONS

USPTO Non-Final Office Action issued Aug. 23, 2012 for U.S. Appl. No. 13/406,476—12 pages.

USPTO Final Office Action issued Dec. 31, 2012 for U.S. Appl. No. 13/406,476, 28 pages.

Patent Cooperation Treaty—International Searching Authority Notice of Transmittal of The International Search Report and The Written Opinion of the International Searching Authority, or The Declaration issued Feb. 20, 2013 for PCT/US13/23397, 11 pages.

Patent Cooperation Treaty—International Searching Authority Notice of Transmittal of The International Search Report and The Written Opinion of The International Searching Authority, or The Declaration issued Apr. 9, 2013 for PCT/US2013/23395, 17 pages.

* cited by examiner

SYSTEMS AND METHODS FOR COMMUNICATING WITH A VEHICLE USER

TECHNICAL FIELD

Embodiments described herein generally relate to communicating with a vehicle user and, more specifically, to systems and methods for a vehicle to implement functional and/or non-functional aspects of a vehicle.

BACKGROUND

Historically, vehicle navigation has helped vehicle users with routing to a destination. Many current vehicle navigation systems provide users with the ability locate a desired destination with audio and video directional outputs. While these current vehicle navigation systems have been beneficial for the routing of vehicles, these current systems are generally static in nature. More specifically, many current systems only allow a user to manually input a destination. While such systems are beneficial, users often do not utilize these systems because of the difficulty of use. Additionally, many of these current navigation systems are not user-specific and do not permit access of data from another sources.

SUMMARY

Systems and methods for communicating with a vehicle user are described. One embodiment of a method includes obtaining a user preference and authorization information relating to a mobile phone device and third party information, recognizing the particular user upon approach with the mobile phone device and implementing the user preference for the particular user, the user preference comprising a setting for a functional aspect of the vehicle and a setting for a non-functional aspect of the vehicle. Some embodiments include providing customized interactive communication with the particular user, based on stored user preferences and third party information.

In another embodiment, a vehicle for communicating with a vehicle user may include a vehicle computing device that includes a memory component that stores logic. When the logic is executed by the vehicle computing device, the logic causes the vehicle computing device to receive a signal for access to the vehicle from a vehicle access device, such as a fob device, key device, etc. In some embodiments, the vehicle access device may be vehicle-specific. Similarly, in some embodiments the logic causes the vehicle computing device to receive a first identifying signal from a first user communications device, where the first user communications device is different than the vehicle access device. In some embodiments, the logic further causes the vehicle computing device to identify the particular user from the first identifying signal, determine whether a user preference data for the particular user is stored remotely, and in response to determining that the user preference data is stored remotely, retrieve the user preference data. In some embodiments, the logic further causes the vehicle computing device to determine whether the user preference data corresponds with a capability of the vehicle and apply the user preference data that corresponds with the vehicle capability to adjust a functional aspect of the vehicle and a non-functional aspect of the vehicle.

In yet another embodiment, a system for communicating with a vehicle user includes a memory component that stores logic that, when executed by the system, causes the system to receive data related to a rental agreement for a rental vehicle, the data comprising a first copy user identifier, receive an identification of the rental vehicle that is subject to the rental agreement, and determine user preference data for a particular user. In some embodiments, the logic causes the system to compare the user preference data with vehicle capability data to determine a setting for a functional aspect of the rental vehicle and a setting for a non-functional aspect of the rental vehicle and send the settings to the rental vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for communicating with a vehicle user. Also included are systems and methods for a vehicle smart calendar, and systems and methods for determining available providers. Accordingly, some embodiments may be configured to provide a user with access to a vehicle and import remotely stored settings into the vehicle system. The stored settings may include functional and/or non-functional aspects of the vehicle, which may be implemented as described herein. Similarly, some embodiments may be configured to utilize a remotely (or locally) stored user schedule to provide reminders, routing, and/or other information to a vehicle user. Further embodiments may be configured to provide routing to way-points based on previously determined user preferences, such as restaurant brands, fuel station brands, service station brands, etc. The systems and methods for incorporating the same will be described in more detail below with specific reference to the appended drawings.

Figure 1:
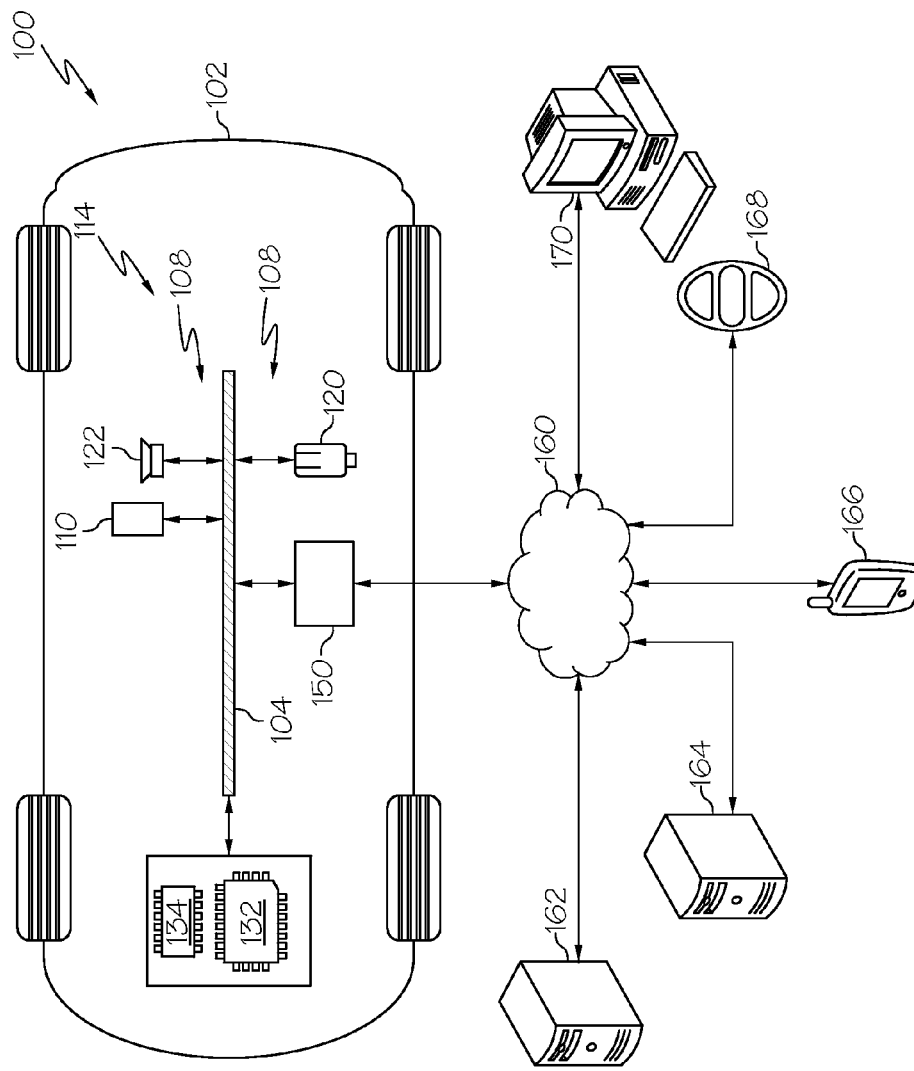
FIG. 1 schematically depicts a network environment for implementing one or more of vehicle access, scheduling, and/or routing options, according to embodiments disclosed herein.

Referring now to FIG. 1, an embodiment of a system 100 that includes a vehicle 102 is schematically depicted. It is noted that, while the vehicle 102 is depicted as an automobile, the vehicle 102 may be any passenger or non-passenger vehicle such as, for example, a terrestrial, aquatic, and/or airborne vehicle. The vehicle 102 may include a vehicle computing device 114 and/or other components. For example, the vehicle computing device 114 may include a communication path 104 that provides data interconnectivity between various vehicle modules disposed within the vehicle 102. Accordingly, the communication path 104 communicatively couples any number of vehicle modules with one another, and allows the vehicle modules to operate in a distributed computing environment. Specifically, each of the vehicle modules can operate as a node that may send and/or receive data. In some embodiments, the communication path 104 may include a conductive material that permits the transmission of electrical data signals to processors, memories, sensors, and actuators throughout the vehicle 102. In another embodiment, the communication path 104 can be a bus, such as for example a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The vehicle 102 generally includes input/output hardware 108 communicatively coupled with the communication path 104. The input/output hardware 108 serves as an interconnection between a human driver and the vehicle 102. The input/output hardware 108 can be any device capable of transforming mechanical, optical, and/or electrical signals into a data signal capable of transmission via the communication path 104. Moreover, the input/output hardware 108 can include any device capable of transforming a data signal into a mechanical, optical, and/or electrical output. Each individual component of the input/output hardware 108 may include one or more processors and one or more memories. In some embodiments, each individual component of the input/output hardware 108 can omit a processor and/or a memory. Accordingly, it is noted that, while specific components are described herein as including a processor and/or a memory, the embodiments described herein should not be so limited.

In some embodiments, the input/output hardware 108 can include a tactile input device 110 such as, for example, a button, a switch, a knob, or the like. The physical motion of the tactile input device 110 can be digitized into a data signal that can be transmitted to a vehicle component. The input/output hardware 108 can further include a microphone 120 for receiving input from a user. The microphone 120 can be any sensor that transforms mechanical vibrations into a data signal. A sensor may include any device that measures a physical quantity and converts it into a data signal, which is correlated to the measured value of the physical quantity, such as, for example, an electrical signal, an electromagnetic signal, an optical signal, a mechanical signal, or the like.

The input/output hardware 108 may also include a speaker 122 for transforming data signals into mechanical vibrations. It should be noted that a signal may include a waveform (e.g., electrical, optical, magnetic, mechanical or electromagnetic), such as direct current (DC), alternating current (AC), sinusoidal-wave, triangular-wave, square-wave, vibration, and the like, capable of traveling through a medium.

Similarly, the input/output hardware 108 can include one or more displays for visually presenting data. The display can be located anywhere in the passenger compartment of the vehicle 102 and can include any medium capable of transmitting a visual output such as, for example, a cathode ray tube, light emitting diodes, liquid crystal displays, plasma displays, or the like. Each of the one or more displays can be a touch screen that, in addition to providing visual information, detects the presence and location of a tactile input upon a surface of or adjacent to the display. Accordingly, each display can receive mechanical input directly upon the optical output provided by the display.

In some embodiments, the vehicle 102 may include a processor 132 communicatively coupled with a memory component 134. The memory component 134 may be configured to store one or more pieces of logic, as described in more detail below. It is also noted that, while the vehicle computing device 114 includes a single processor 132 and a single memory component 134; this is merely one example. For example, the vehicle 102 and/or vehicle computing device 114 may include a plurality of components each having one or more memories and/or processors that are communicatively coupled with one or more of the other components. Thus, the embodiments described herein may utilize a distributed computing arrangement to perform any portion of the logic described herein.

According to the embodiments described herein, the processor 132 may include any device capable of executing machine-readable instructions, which may be stored on a non-transitory computer-readable medium. Accordingly, each processor may include a controller, an integrated circuit, a microchip, a computer, and/or any other computing device. The memory described herein may include RAM, ROM, a flash memory, a hard drive, and/or any device capable of storing machine-readable instructions.

Embodiments of the present disclosure include logic that includes machine-readable instructions and/or an algorithm written in any programming language of any generation (e.g., 1GL, 2GL, 3GL, 4GL, and/or 5GL) such as, e.g., machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

Moreover, the logic can be distributed over various components that are communicatively coupled over a network 160 that may include one or more cellular networks, satellite networks and/or computer networks such as, for example, a wide area network, a local area network, personal area network, a global positioning system and combinations thereof. Accordingly, the vehicle 102 can be communicatively coupled to the network 160 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Thus, any components of the vehicle 102 can utilize one or more network 160 components to transmit signals over the Internet or World Wide Web.

In some embodiments, the vehicle 102 includes network interface hardware 150 for communicatively coupling the vehicle 102 with the network 160. The network interface hardware 150 can be communicatively coupled to the communication path 104 and can be any device capable of transmitting and/or receiving data via the network 160. Accordingly, the network interface hardware 150 can include an antenna and/or other communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices.

The network 160 can communicatively couple the vehicle 102 with other devices in a flexible client-server relationship. More specifically, the vehicle 102 may be a configured as a server to and/or a client of any device communicatively coupled to the vehicle 102 via the network 160. Specifically, the network 160 can be configured to enable the delivery of cloud resources to and/or from the vehicle 102. Any device communicatively coupled to the vehicle 102 can deliver a cloud resource to the vehicle 102 via the network 160. Similarly, the vehicle 102 can deliver a cloud resource via the network 160 to any device communicatively coupled to the vehicle 102. Accordingly, cloud resources such as, for example, processing, storage, software, and information can be shared via the network 160.

Referring still to FIG. 1, the network 160 may be utilized to communicatively couple the vehicle 102, one or more remote computing devices 162, one or more third party remote computing devices 164, one or more mobile phone devices 204, one or more vehicle access devices 168, and one or more user community devices 170. Accordingly, each of these devices can be communicatively coupled to one another directly or indirectly via the network 160. For example, one or more devices communicatively coupled to the network 160 can operate as an intermediary to transmit data between any of the other devices. Accordingly, the network 160 can facilitate a distributed computing arrangement amongst the vehicle 102 and the other devices. Specifically, any of the devices communicatively coupled to the network 160 can share cloud resources such that each communicatively coupled device can perform any portion of the logic described herein.

It should also be understood that while the components in FIG. 1 are illustrated as communicating through the network 160, this representation may also include instances of direct communication between the vehicle 102 and a device. As an example, the vehicle access device and/or mobile phone device 166 may communicate with the vehicle computing device 114 via a direct near field communication protocol.

As is noted above, the vehicle 102 can be communicatively coupled to the one or more devices via the network 160. Each of the one or more devices can include one or more processors and one or more memories. The one or more processors can execute logic to provide cloud resources to the vehicle 102 and/or any other device communicatively coupled to the network 160. For example, the one or more devices can provide supplementary processing power, via relatively high powered processors, to the vehicle 102. Additionally, the one or more devices can provide supplementary data storage to the vehicle 102. Moreover, the one or more devices can provide platforms such as, for example, a social networking service, news service, weather service, traffic service, map service (e.g., restaurant data, fuel station data, service station data), and any other service capable of being exchanged between a server and a client.

The user computing device 170 may also be coupled to the network 200 and may be configured as any portable and/or non-portable computing device, such as a personal computer, laptop computer, personal digital assistant (PDA), mobile phone, etc. In some embodiments, the user computing device 170 may be implemented as the mobile phone device 166. Regardless, the user computing 104*a* may include a memory component that stores logic that is similar to the logic stored by the vehicle computing device 134, but configured for slightly different functionality. As an example, logic stored by the user computing device may be configured to cause the user computing device 170 to provide interfaces and receive user input related to providing access to the vehicle 102. Similarly, this logic may be configured to cause the user computing device 170 to provide interfaces and options related to user schedules that may be utilized in the vehicle 102. The logic may be similarly configured to cause the user computing device 170 to provide interfaces and/or options for configuring user vehicle routing preferences, as discussed in more detail, below.

Similarly, the remote computing device 162 may include a server and/or other computing device for providing information to the vehicle computing device 114 and/or the vehicle computing device 114. In some embodiments, the remote computing device 162 may include a memory component for storing logic that is similar to the other logic discussed above, but may be configured for different functionality. More specifically, the logic stored by the remote computing device 162 may be configured to remotely store and provide vehicle access data, user scheduling data, and/or user routing preference data. Thus, the remote computing device 162 may be configured for "cloud" storage of data described herein.

Also included is the third party remote computing device 164. The third party remote computing device 164 may be configured to compile and/or store third party data, such as news, weather reports, traffic reports, restaurant data, fuel station data, service station data, etc. As described in more detail below, this data may be accessed by the vehicle computing device 114 for performing the functionality described herein.

Figure 2:
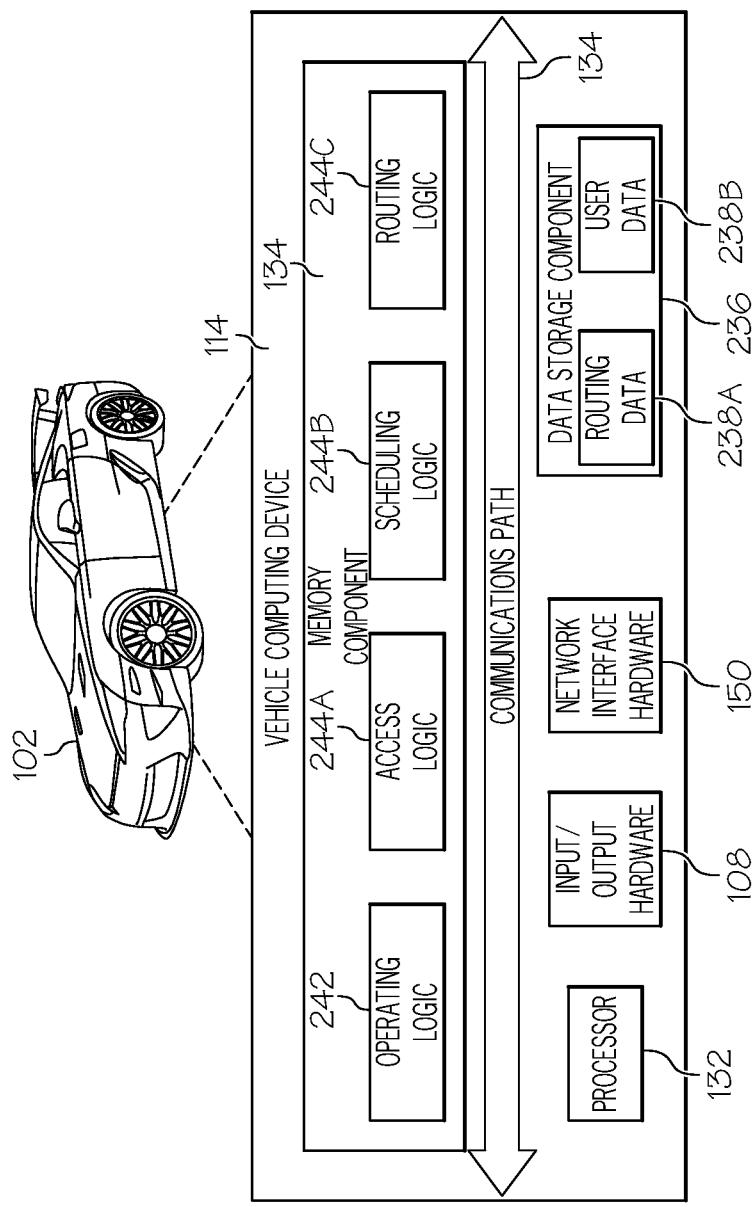
FIG. 2 schematically depicts a vehicle computing device, according to embodiments disclosed herein.

FIG. 2 depicts a vehicle computing device 114, according to one embodiment disclosed herein. In the illustrated embodiment, the vehicle computing device 114 includes a processor 132, input/output hardware 108, network interface hardware 150, a data storage component 236 (which stores routing 238*a*, user data 238*b*, and/or other data), and the memory component 134. The memory component 134 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 114 and/or external to the vehicle computing device 114.

Additionally, the memory component 134 may store operating logic 242, access logic 244*a*, scheduling logic 244*b*, and routing logic 244*c*. The access logic 244*a*, the scheduling logic 244*b*, and the routing logic 244*c* may each include a plurality of different pieces of logic, each of which may be embodied as a computer program, firmware, and/or hardware, as an example. A local interface 246 is also included in FIG. 2 and may be implemented as a bus or other communication interface to facilitate communication among the components of the vehicle computing device 114.

As discussed above, the processor 132 may include any processing component operable to receive and execute instructions (such as from the data storage component 236 and/or the memory component 134). The input/output hardware 108 may include and/or be configured to interface with a monitor, positioning system, keyboard, mouse, printer, image capture device, microphone, speaker, gyroscope, compass, global positioning system (GPS), seatbelt sensor, user sensor, fuel sensor, a speed sensor, volume sensor, a door lock sensor, a passenger sensor (such as a weight sensor, seat sensor, etc.), a proximity sensor such as a radio frequency identifier (RFID) sensor, communication device (e.g., for cellular, internet, and/or other communications), and/or other device for receiving, sending, and/or presenting data as described herein. The network interface hardware 150 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the vehicle computing device 114 and other computing devices.

The operating logic 242 may include an operating system and/or other software for managing components of the vehicle computing device 114. Similarly, as discussed above, the access logic 244*a* may reside in the memory component 134 and may be configured to cause the processor 132 to provide the access functionality described herein. Similarly, the scheduling logic 244*b* may be utilized to provide the scheduling functionality described herein. The routing logic 244*c* may cause the vehicle computing device 114 to provide the routing functionality, as described herein.

It should be understood that while the components in FIG. 2 are illustrated as residing within the vehicle computing device 114, this is merely an example. In some embodiments, one or more of the components may reside external to the vehicle computing device 114. It should also be understood that, while the vehicle computing device 114 in FIG. 2 is illustrated as a single device, this is also merely an example. In some embodiments, the access logic 244*a*, the scheduling logic 244*b*, and/or the routing logic 244*c* may reside on different devices.

Additionally, while the vehicle computing device 114 is illustrated with the access logic 244*a*, the scheduling logic 244*b*, and the routing logic 244*c* as separate logical components, this is also an example. In some embodiments, a single piece of logic may cause the vehicle computing device 114 to provide the described functionality.

Figure 3:
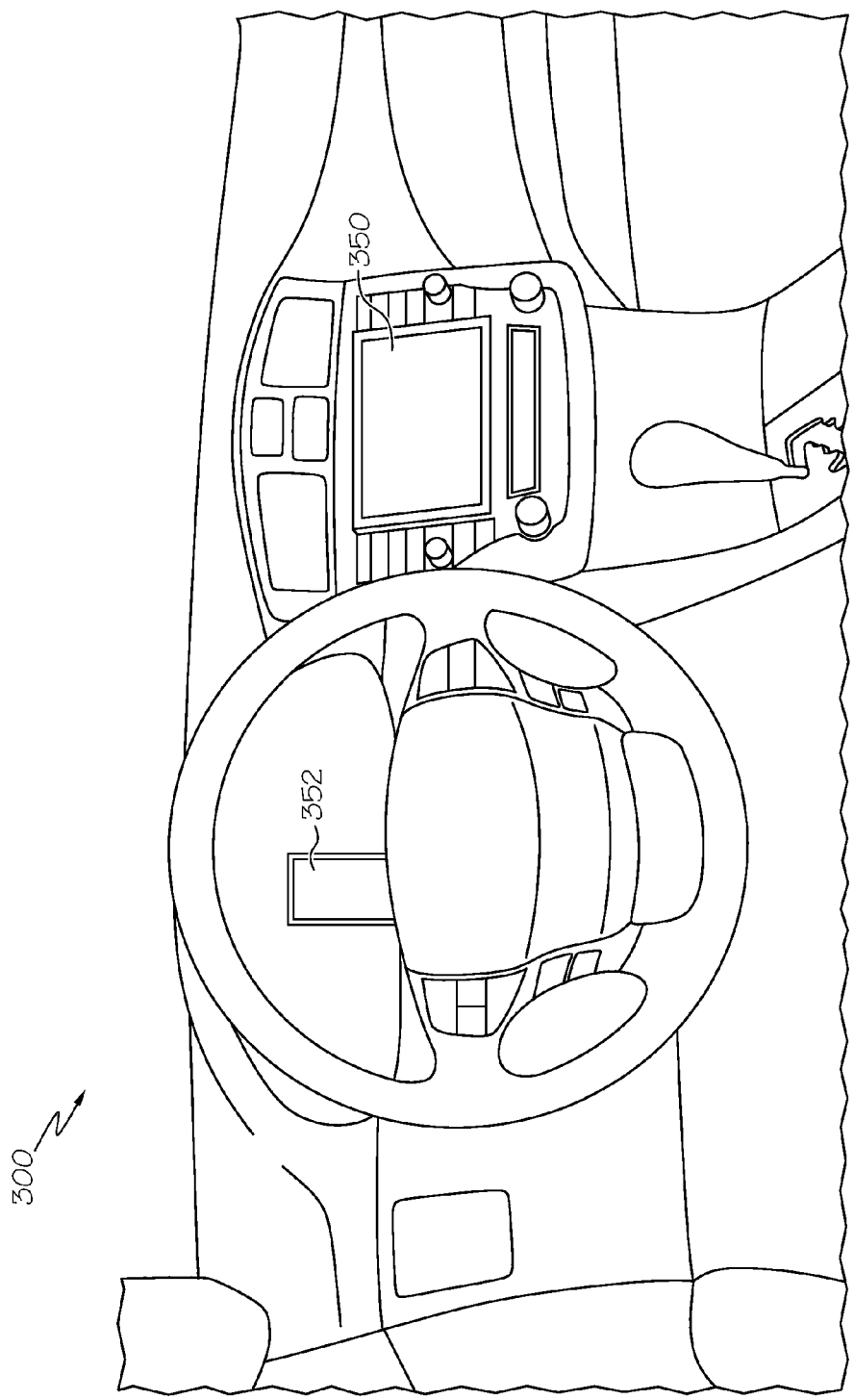
FIG. 3 schematically depicts a vehicle interior with routing system, according to embodiments disclosed herein.

FIG. 3 depicts a vehicle interior 300 with a routing system, according to embodiments disclosed herein. As illustrated, the vehicle interior 300 may include a console display 350 and a dash display 352. The console display 350 may be configured to provide one or more interfaces, as disclosed herein, related to user preferences, routing, music, and/or other data. The dash display 352 may similarly be configured to provide one or more interfaces, but often the data provided in the dash display 352 is abbreviated from the data provided by the console display 350. Regardless, at least a portion of the interfaces depicted and described herein may be provided on either or both the console display 350 and the dash display 352.

Figure 4:
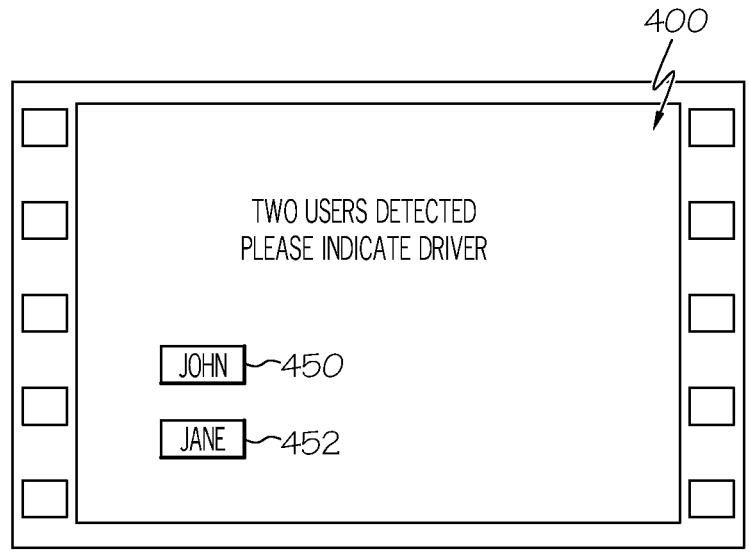
FIG. 4 depicts a vehicle authentication interface for determining a driver in a vehicle, according to embodiments disclosed herein.

FIG. 4 depicts a vehicle authentication interface 400 for determining an identity of a driver in a vehicle 102, according to embodiments disclosed herein. More specifically, the vehicle 102 may be configured to detect a user attempting to enter the vehicle 102 via the vehicle access device 168 (FIG. 1). This attempt may be in the form of a fob signal, key turn, and/or other access request. Assuming that the vehicle access device 168 is valid, the user may be permitted access to the vehicle 102.

The vehicle 102 may additionally detect a first identifying signal from the mobile phone device 166 (FIG. 1). The mobile phone device 166 may communicate a user identifier to the vehicle 102. The vehicle 102 may then access local storage to determine the identity of the user. If data regarding the user is not stored locally, the vehicle 102 may communicate with the remote computing device 162 (or the mobile phone device 166) for the user data. Regardless, once the user is identified, the vehicle 102 may access locally and/or remotely stored user preferences for functional and/or non-functional aspects of the vehicle 102.

However, oftentimes two or more users seek access to the vehicle 102, each with their own mobile phone device 166. The vehicle 102 may thus receive a first identifying signal from a first mobile phone device 166 and a second identifying signal from a second mobile phone device 166. Accordingly, the vehicle 102 may determine which one of the users is the driver of the vehicle 102. As illustrated in FIG. 4, this determination may be made via the vehicle authentication interface 400. In the vehicle authentication interface 400, the vehicle computing device 114 may provide a request for the users to identify which is the driver, as illustrated in options 450 and 452. Upon selection of one of the options 450, 452, the user preference for the selected driver will be applied to the functional aspects of the vehicle 102. The functional aspects of the vehicle 102 may include a driver seat position setting, a language setting, a units setting, an avatar setting, a minor position setting, a steering wheel setting, a radio setting, a heat ventilation air conditioning (HVAC) system setting, a previous destination setting, etc. Similarly, non-functional aspects of the vehicle 102 may also be implemented. Non-functional aspects may include a playlist setting, a preferred music setting, a schedule setting, an action item setting, a news setting, a waypoint setting, such as a restaurant setting, a fuel station setting, etc. Additionally, functional and non-functional aspects of the vehicle 102 may be customized for the non-driver users, such as passenger seat position, HVAC system setting, music, images, etc.

It should be understood that while in some embodiments the driver may be determined from the vehicle authentication interface 400, this is merely an example. In some embodiments, a priority list may be implemented such that if a first user and a second user enter the vehicle 102, the first user is always the driver. Similarly, in some embodiments, a determination of the origin of the mobile phone device 166 may determine which user is the driver. As an example, if the vehicle 102 determines that the first user is approaching the driver side door and the second user is approaching the passenger side door, a determination may be made that the first user is the driver. Other mechanisms for determining which user is the driver may also be implemented.

It should also be understood that the functional and/or non-functional aspects of the vehicle 102 may be determined in any number of different ways. As an example, if a user adjusts a seat position, selects a radio station, and/or performs other action within the vehicle 102 (or other vehicle), this setting may be stored. Storage of the setting may be automatic and/or user initiated storing. The setting may be stored locally on the vehicle computing device 114 and/or at the remote computing device 162. Similarly, one or more of the settings may be manually set using the console display 350. The user may manually key settings into the vehicle computing device 114 for local and/or remote storage. The user may similarly manually enter user settings into the user computing device 170 (and/or mobile phone device 166) for storage on the user computing device 170, remote computing device 162, and/or vehicle computing device 114. Yet another mechanism for determining user preferences is via predictive capabilities of the vehicle computing device 114, the user computing device 170, the mobile phone device 166, and/or the remote computing device 162.

Figure 5:
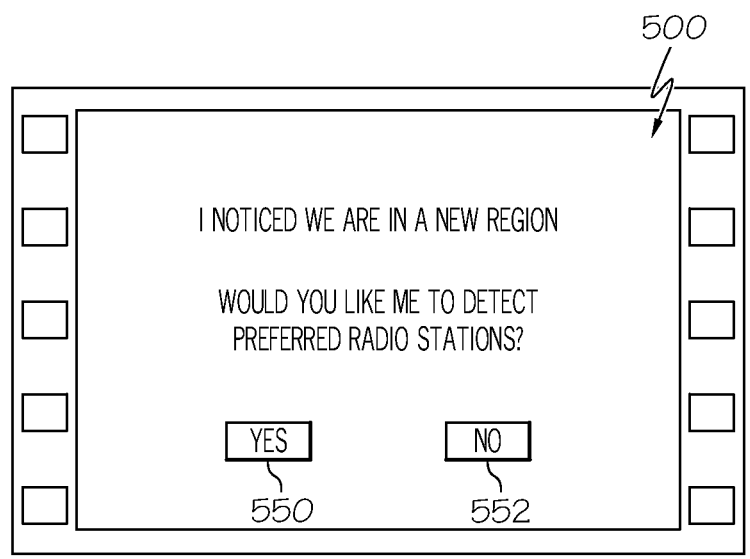
FIG. 5 depicts a vehicle geographical interpretation interface for providing an option to determine user settings, according to embodiments disclosed herein.

FIG. 5 depicts a vehicle geographical interpretation interface 500 for providing an option to determine user settings, according to embodiments disclosed herein. As illustrated, the vehicle geographical interpretation interface 500 may be configured to provide an option to detect functional and/or non-functional aspects of the vehicle 102. As an example, when the vehicle computing device 114 determines that the vehicle 102 is currently in a different geographic region, the vehicle computing device 114 may determine which settings may be regionally based. Regionally based settings may include terrestrial radio stations, climate control, seat heaters/coolers, etc. In the example of FIG. 5, the vehicle computing device 114 determined that the radio stations are regional. Based on the user's previously set radio stations, the vehicle computing device 114 may determine comparable radio stations for the current geographical location. The vehicle geographical interpretation interface 500 may then provide a first option 550 that permits the vehicle computing device 114 to determine preferred radio stations for this geographic region. The second option 552 denies the vehicle computing device 114 permission to make this determination.

Figure 6:
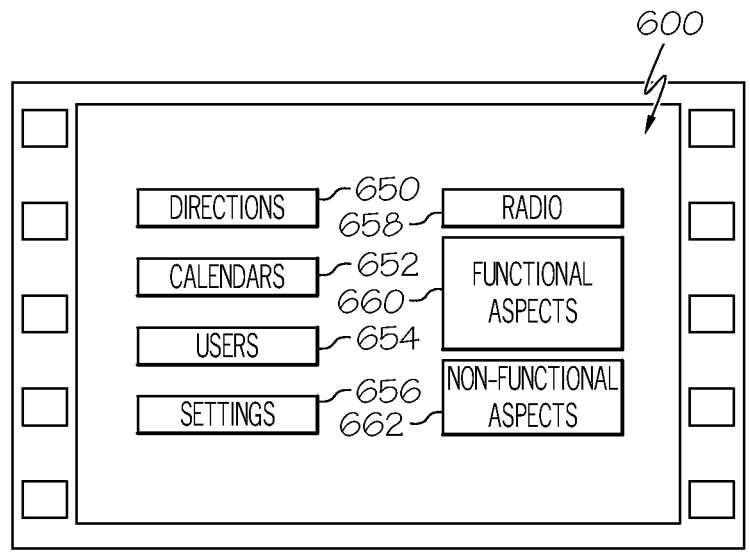
FIG. 6 depicts a vehicle menu interface for providing a plurality of menu options, according to embodiments disclosed herein.

FIG. 6 depicts a vehicle menu interface 600 for providing a plurality of menu options, according to embodiments disclosed herein. As illustrated, the vehicle menu interface 600 may provide a plurality of options for the vehicle 102. As an example, once the users, driver, and/or regional settings are determined, the vehicle menu interface 600 may be provided. If no such preliminary determinations are made, the vehicle computing device 114 may default to the vehicle menu interface 600. The vehicle menu interface 600 includes a plurality of options, such as a directions option 650, a calendars option 652, a users option 654, a settings option 656, a radio option 658, a functional aspects option 660, and a non-functional aspects option 662.

In response to selection of the directions option 650, the user may be presented with one or more interfaces for manually entering a destination for vehicle routing. In response to selection of the calendars option 652, one or more remotely and/or locally stored user schedules may be provided. In response to selection of the users option 654, options related to users of the vehicle 102 may be provided. In response to selection of the settings option 656, vehicle settings may be provided to the user for viewing and/or editing. In response to selection of the radio option 658, radio settings and/or channels may be provided. In response to selection of the functional aspects option 660, functional aspect settings may be provided to the user for viewing and/or editing. In response to selection of the non-functional aspects option 662, non-functional aspect settings may be provided to the user for viewing and/or editing.

Figure 7:
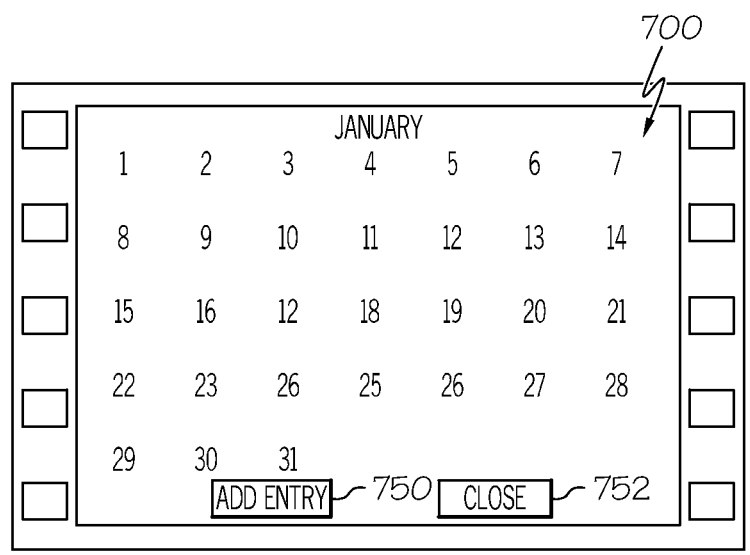
FIG. 7 depicts a vehicle schedule interface for providing a remotely stored user schedule, according to embodiments disclosed herein.

FIG. 7 depicts a vehicle schedule interface 700 for providing a remotely stored user schedule, according to embodiments disclosed herein. As illustrated, in response to selection of the calendars option 652 from FIG. 6, the vehicle schedule interface 700 may be provided. The calendar depicted in the vehicle schedule interface 700 may be retrieved from a remotely stored user schedule and may include one or more events and/or action items for the user. By selecting one or more of the days in the vehicle schedule interface 700, the vehicle computing device 114 may provide events and/or action items that the user has scheduled for that day. Additionally, an add entry option 750 may be provided for a user to add an event and/or action item. A close option 752 may be provided for returning to the vehicle menu interface 600 from FIG. 6.

Figure 8:
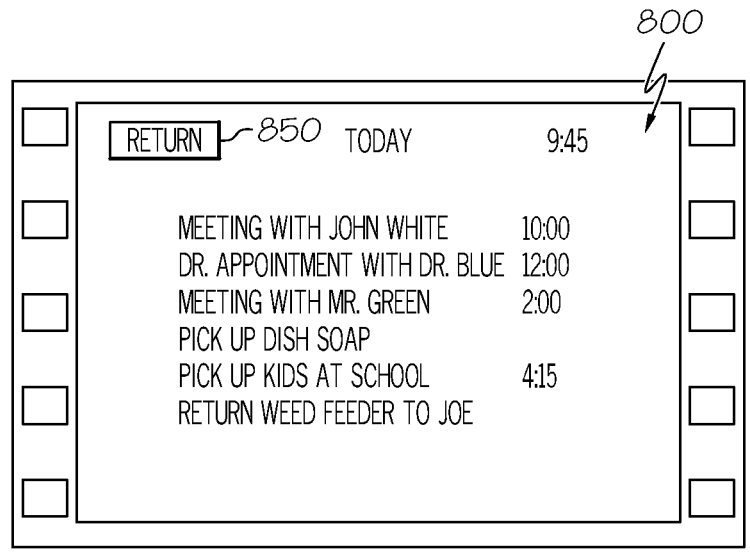
FIG. 8 depicts a vehicle event interface for providing events and action items, according to embodiments disclosed herein.

FIG. 8 depicts a vehicle event interface 800 for providing events and action items, according to embodiments disclosed herein. The vehicle event interface 800 may be provided in response to selection of a day that is displayed in the vehicle schedule interface 700 from FIG. 7. As illustrated, the vehicle event interface 800 may provide times, descriptions, and/or locations of events. Action items, which may not have a designated time or location for completion, may also be provided. In response to a user selecting one of the events and/or action items, options to view more details, edit, and/or delete the event may be provided. A return option 850 is also provided for returning to the vehicle menu interface 600 from FIG. 6.

Figure 9:
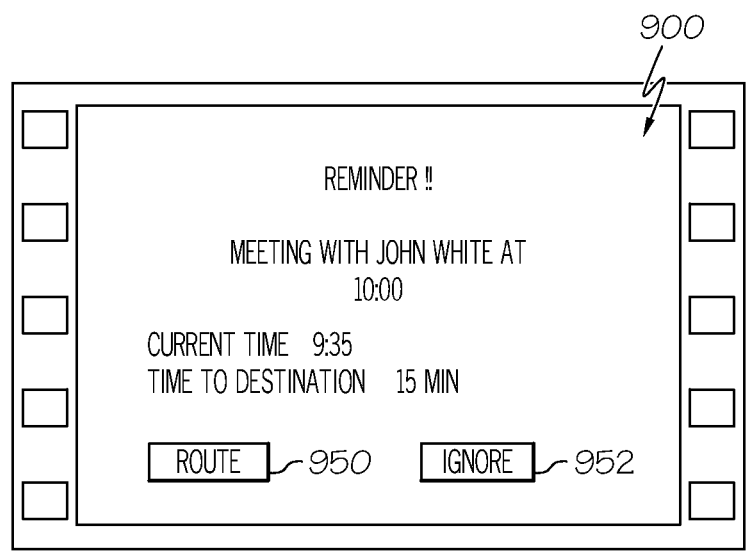
FIG. 9 depicts a vehicle reminder interface for providing a reminder from a remotely stored user schedule, according to embodiments disclosed herein.

FIG. 9 depicts a vehicle reminder interface 900 for providing a reminder from a remotely stored user schedule, according to embodiments disclosed herein. As illustrated, when a determination is made that an event time is approaching, the vehicle computing device 114 may notify the user with the vehicle reminder interface 900. More specifically, if the user schedule is remotely stored, the remote computing device 162 and/or the mobile phone device 166 may send a request to the vehicle computing device 114 for providing the reminder. Similarly, in some embodiments, the vehicle computing device 114 may store the reminder locally and may provide the reminder at a designated time. The designated time may be determined based on a user selected predetermined time and/or based on the current location of the vehicle 102 with respect to the event. As an example, if the vehicle 102 is 30 minutes away from the event, the vehicle computing device 114 may be configured to provide the reminder 30 minutes, plus a predetermined time before the event. This allows the user to reach the event prior to the event time. Additionally, while FIG. 9 depicts an event reminder, similar interfaces may be provided for an action item reminder and/or other reminders.

Similarly, in some embodiments, the vehicle computing device 114 may determine that an action item could be efficiently completed based on the current time, the time of an upcoming event, the location of the vehicle 102, the location of the event, and the location of the action item. As such, the vehicle computing device 114 may calculate a time to complete the action item, remind the user of the action item, and provide the reminder at a time that will allow both tasks to be completed.

Also included in the vehicle reminder interface 900 is a route option 950 and an ignore option 952. In response to selection of the route option 950, the vehicle computing device 114 may determine a route from the current location to the event and may provide routing guidance to the event. In response to selection of the ignore option 952, the vehicle computing device 114 may return to the vehicle menu interface 600 from FIG. 6.

Figure 10:
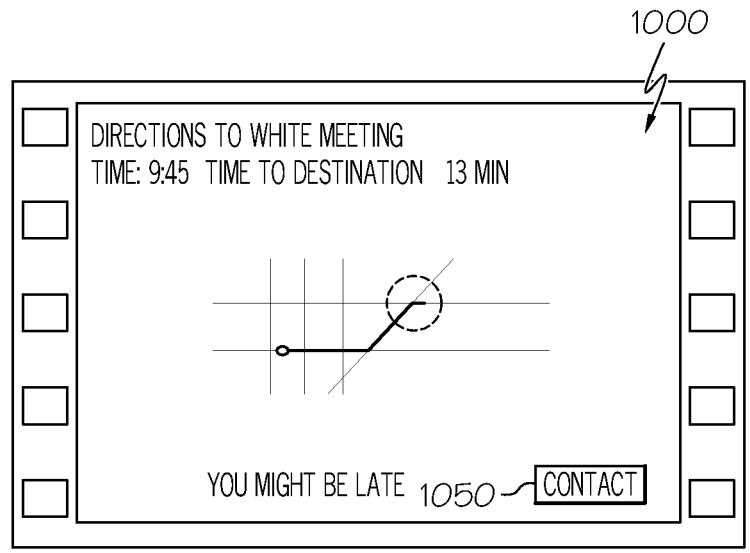
FIG. 10 depicts a vehicle routing interface for routing to an event, according to embodiments disclosed herein.

FIG. 10 depicts a vehicle routing interface 1000 for routing to an event, according to embodiments disclosed herein. As illustrated, in response to selection of the route option 950 from FIG. 9, the vehicle computing device 114 may determine a route to the event and provide that route to the user. Additionally, depending on third party traffic data, third party weather data, third party road condition data, etc. the estimated time of arrival for the vehicle 102 may change. As such, the vehicle computing device 114 may provide updates to the estimated time for arrival. If the vehicle computing device 114 determines that the vehicle 102 will likely be late to the event, a contact option 1050 may be provided, so that the user may inform the other parties to the event of the estimated time of arrival.

Figure 11:
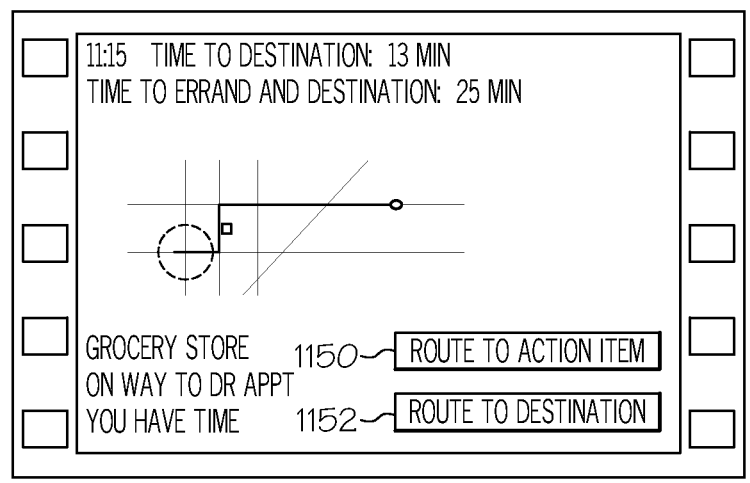
FIG. 11 depicts another vehicle routing interface for routing to an action item, according to embodiments disclosed herein.

FIG. 11 depicts another vehicle routing interface 1100 for routing to an action item, according to embodiments disclosed herein. As illustrated, if the vehicle computing device 114 determines, based on the vehicle location, an action item location, current traffic, weather, and/or other information, that there is adequate time to complete an action item and may provide a route to the action item. Also included in the vehicle routing interface 1100 are a route to action item option 1150 and a route to destination option 1152. By selecting the route to action item option 1150, the vehicle computing device 114 may provide routing guidance to the action item. Upon completing the action item, the vehicle computing device 114 may then route the user to the event.

It should be understood that an action item may or may not include a time of performance or a location. As such, the vehicle computing device 114 and/or other computing device described herein may be configured to determine a location and/or time for completing the action item. As an example, if the action item is "pick up milk," the vehicle computing device 114 may determine from the text that milk is the object of the action item. The vehicle computing device 114 may additionally determine that milk may be purchased at a grocery store, fuel station, drug store, etc. The vehicle computing device 114 may then determine a location that is convenient for the user to carry out the action item, based on the current location of the vehicle 102, the location of other events and/or the location of other action items. Additionally, some embodiments, may allow the user to provide preferred waypoint brands, as described in more detail below. Referring to the example above, if the user prefers a particular type of store for purchasing milk (e.g., a grocery store), this indication may be provided by the user and/or determined from user actions.

Figure 12:
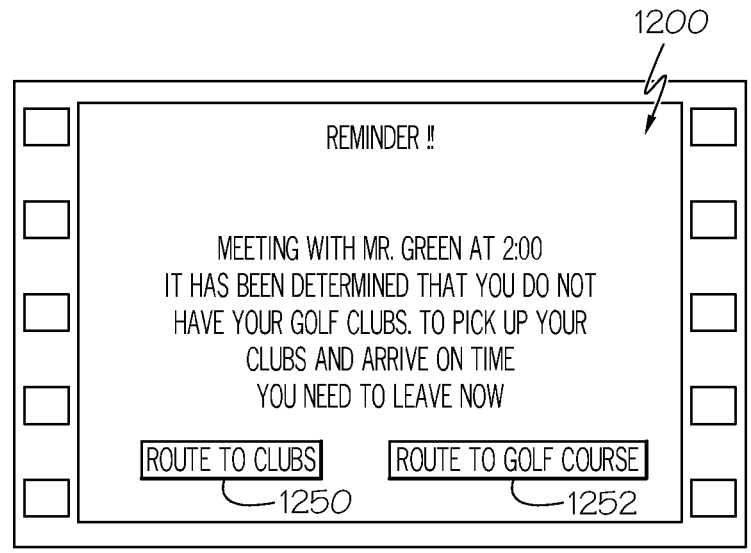
FIG. 12 depicts another vehicle reminder interface for providing a reminder to an event that is associated with an accessory, according to embodiments disclosed herein.

FIG. 12 depicts another vehicle reminder interface 1200 for providing a reminder to an event that is associated with an accessory, according to embodiments disclosed herein. As illustrated, some events and/or action items may be associated with an accessory. As an example, if the event is a golf match, the vehicle computing device 114 may determine that the user will wish to bring her golf clubs to the golf course. The vehicle computing device 114 may determine that the event is associated with an accessory through a user indication, through past events, and/or through a logical determination. As an example, if the user has previously traveled to golf courses for similar events and the user stopped to retrieve her golf clubs, the vehicle computing device 114 may utilize this historical information to determine that golf clubs are likely desired for this event. Similarly, if the destination is a golf course and the event mentions the word "golf," "green," "play," and/or other similar term, the vehicle computing device 114 may determine that golf clubs are desired.

Regardless of the mechanism for determining that the event is associated with the event, the vehicle computing device 114 may receive a positioning signal and utilize the positioning signal to determine whether the accessory is currently in proximity of the vehicle 102. This determination may be made through a proximity sensor, such as a radio frequency identifier (RFID) sensor in the vehicle 102 that receives an RFID signal from the accessory, through past actions, and/or through a user indication. As such, the vehicle reminder interface 1200 includes a route to accessory option 1250 for retrieving the accessory. The accessory location may be determined from past actions, a location identifier, and/or user input. A route to event option 1252 is also provided in the vehicle reminder interface 1200 for routing the vehicle 102 directly to the event.

As an example, the vehicle computing device 114 may communicate with the vehicle GPS to determine that the vehicle has arrived at a golf course. The vehicle computing device 114 may additionally communicate with the RFID sensor determine that after stopping at the golf course, the user's golf clubs (which may be equipped with an RFID tag) are removed from the vehicle 102. Upon the vehicle 102 leaving the golf course, the vehicle computing device 114 may determine that the golf clubs never returned to the vehicle. With this information, upon determining that the user's upcoming appointment is at the golf course, the vehicle computing device 114 may determine that the golf clubs are likely still at the previous golf course. A notification and/or routing to this previous destination may be provided.

Figure 13:
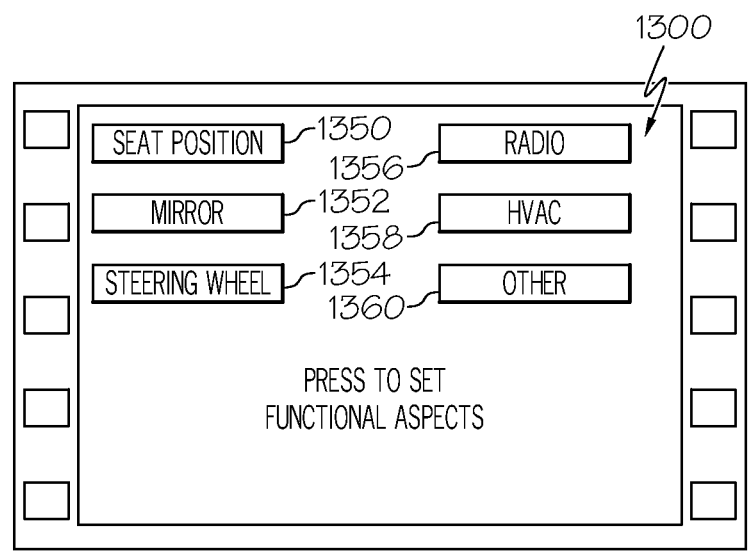
FIG. 13 depicts a vehicle settings interface for providing options to one or more functional aspects of the vehicle, according to embodiments disclosed herein.

FIG. 13 depicts a vehicle settings interface 1300 for providing in-vehicle options to one or more functional aspects of the vehicle 102, according to embodiments disclosed herein. The vehicle settings interface 1300 may be provided in response to selection of the functional aspects option 660 from FIG. 6. As illustrated, the vehicle settings interface 300 includes a plurality of functional options for a particular user. Accordingly, the vehicle settings interface 1300 includes a seat position option 1350, a mirror option 1352, a steering wheel option 1354, a radio option 1356, a heating ventilation air conditioning (HVAC) option 1358, and an other option 1360.

In response to selection of one or more of the options depicted in the vehicle settings interface 1300, the vehicle computing device 114 may provide the current settings for that functional aspect of the vehicle 102. The vehicle computing device 114 may additionally provide options to reset, remove, add, and/or otherwise edit the settings that are provided.

Figure 14:
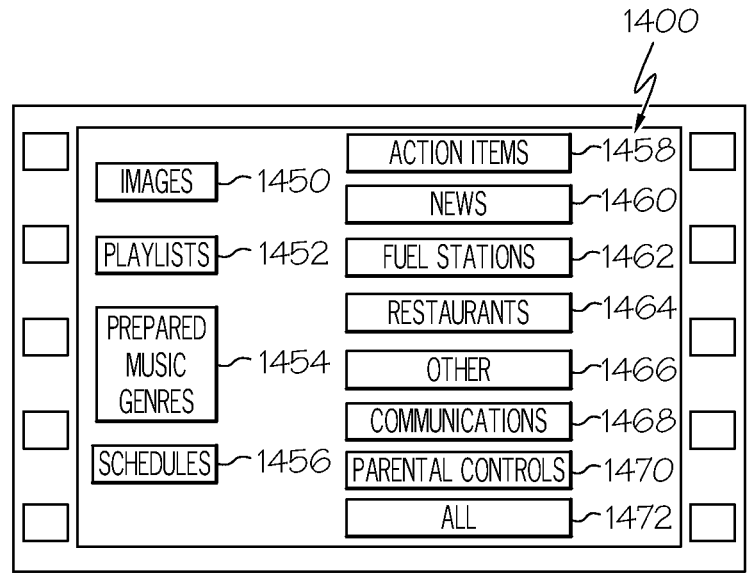
FIG. 14 depicts another vehicle settings interface for providing options to one or more non-functional aspects of the vehicle, according to embodiments disclosed herein.

FIG. 14 depicts another vehicle settings interface 1400 for providing in-vehicle options to one or more non-functional aspects of the vehicle 102, according to embodiments disclosed herein. The vehicle settings interface 1400 may be provided in response to a selection of the non-functional aspects option 662 from FIG. 6. As illustrated, the vehicle settings interface 1400 includes an images option 1450, a playlists option 1452, a preferred music genres option 1454, a schedules option 1456, an action items list 1458, a news option 1460, a fuel stations option 1462, a restaurants option 1464, a communications option 1468, a parental control option 1470, an other option 1472, and an all option 1468. Other non-functional options may be provided, as well.

While the user may manually alter one or more of these non-functional aspects of the vehicle 102, in some embodiments the vehicle computing device 114 may determine the non-functional aspects of the vehicle 102, based on past user settings. As an example, if a user selects an image, such as on a social media website, the vehicle computing device 114 may recognize that this is an image that the user prefers. Similarly, if the user participates in "cloud storage" of music files, the vehicle computing device 114 may analyze the remotely stored music files and determine preferred music genres. As discussed above, the schedules and action items may be determined from a remotely stored calendar, a mobile calendar, and/or elsewhere. News, fuel stations, restaurants may similarly be determined based on user input and/or past actions.

As an example, the communications option 1468 may provide the user with options for the vehicle 102 to communicate directly with social media networks, cellular networks, data networks, etc. More specifically, the vehicle computing device 114 may be configured to send and receive emails, social media messages, short message system (SMS) messages, etc. directly from the vehicle 102. Such embodiments may utilize text inputs, voice to text, and/or text to voice technologies. Similarly, other options under the communications option 1468 may include options to "check in" to a location via a social media site using a communication directly from the vehicle computing device 114. Contacts (via social media or another source) may also be provided under the communications option 1468. Options for social media status changes may be provided, as well as trending nearby locations. Options for specials provided by nearby vendors may also be provided under the communications option 1468, as well as options to contact a message sender or social media contact directly from the vehicle 102. Similarly, some embodiments provide options to provide routing inputs directly from social media and/or received messages.

Similarly, in some embodiments the communications option 1468 may include options to determine a current location and/or destination of the vehicle 102. The vehicle 102 may then provide a user option to send that location and/or destination to a social media site. Upon selection of the user option, the vehicle 102 may format the location and/or destination data into a format that is compatible with a predetermined messaging protocol (e.g., SMS, email, FACEBOOK®, TWITTER®, etc.). The information may then be sent from the vehicle 102 to a predetermined recipient.

Further, in some embodiments, the communications option 1468 may include options for providing a vehicle profile to a social media site that links with one or more user's social networking profile. When the user enters the vehicle 102 the vehicle computing device 114 may identify the user and link the vehicle profile with that user's social networking profile.

The vehicle profile may then communicate with the vehicle to provide a user interface for updating status information with the social networking profile.

In some embodiments, the communications option 1466 may include options to access user-defined data and provide this data as an overlay on a vehicle display, such as the console display 350 and/or the dash display 352. More specifically, contact data, crime data, trending data, etc. may be retrieved from the third party remote computing device 164. When the vehicle is within a predetermined area of the geographic location, the information may be provided.

Similarly, the parental controls option 1470 may be configured to provide smart vehicle controls by an authorized user. More specifically, the parental controls option 1470 may be configured to provide options to remotely monitor a position of the vehicle 102 and to receive an alert when the vehicle 102 performs a predetermined action or when passengers in the vehicle 102 perform a predetermined action of which a parent (vehicle owner) does not approve. In some embodiments, a vehicle owner may be remotely alerted (via SMS, email, telephone call, etc.) when the vehicle 102 and/or passengers exceed preset criteria. Similarly, in some embodiments predetermined vehicle functionality may be enabled or disabled (e.g., auto-locks of doors). In still some embodiments, an audible message may be provided to an occupant of the vehicle 102 when the action is detected.

As an example, the vehicle 102 may communicate with the remote computing device 162 and/or the user computing device 170 to provide location data to the owner of the vehicle. Oftentimes, the owner of the vehicle 102 is not the user and thus the owner will wish to identify the actions that take place in the vehicle 102. As discussed in more detail below, the vehicle computing device 114 may communicate with one or more input/output hardware 108 for determining various states of the vehicle 102. Based on predetermined criteria regarding the states of the vehicle 102, notification may be sent to the owner via a predetermined mechanism for communication (e.g. web interface, text, email, phone call, etc.).

Examples of the permission settings that may be provided via the parental controls option 1470 may include maximum vehicle speed, maximum radio volume, rating and/or control of media (radio, video, etc.), disabling the vehicle until seatbelts are fastened, disallowing media without a fastened seat belt. Similarly, monitoring and notification options provided via the parental controls option 1470 may include speed notification, occupant detection, geo-fencing for vehicle location control, overall location, and driving statistics.

Similar options that may be provided within the parental controls option 1470 include options to remotely monitor a position of the vehicle 102 and receive an alert when the vehicle enters a predetermined area, such as a high-crime area, child predator area, etc. Embodiments may then access the third party remote computing device 164 to retrieve crime data to determine unsafe areas. In some embodiments the vehicle owner may create a geo-fenced area, where the owner is notified when the vehicle enters the geo-fenced area. Similarly, in some embodiments, vehicle functions may be automatically enabled (e.g., auto-locks) or disabled (e.g., radio volume) when the vehicle enters the area. Options may also be provided for users to share high-crime areas with others.

As an example, the owner of the vehicle may identify one or more locations that the owner does not wish the vehicle to approach. This identification may be made via one or more interfaces depicted herein and/or via the user computing device 170. In some embodiments, the owner may access third party data (such as crime maps) from the third party remote computing device 164. Regardless, once the locations are identified and sent to the vehicle computing device 114, the vehicle computing device 114 may communicate with the vehicle GPS to determine whether the vehicle 102 is approaching one of the predetermined locations. If the vehicle computing device 114 determines that the vehicle 102 is approaching one of the predetermined locations, the vehicle computing device 114 may send a notification and/or perform other action described above.

Another option that may be provided within the parental controls option 1470 is an option for smart monitoring occupancy detection. More specifically, embodiments disclosed herein may be configured to remotely monitor the number of occupants in the vehicle 102. If the vehicle 102 detects that the number of occupants exceeds a predetermined threshold, an alert may be sent from the vehicle 102, such that it is received by the owner of the vehicle (e.g., the parent). Depending on the particular embodiment, the vehicle 102 may send an email, SMS message, social media message, telephone call, etc. Similarly, some embodiments may be configured to disable one or more aspects of the vehicle (e.g., the volume of the radio), if the number of occupants exceeds the threshold. In some embodiments, the vehicle may be configured with a camera in the interior of the vehicle 102, such that if the occupancy level exceeds the threshold, a picture is automatically taken and sent to the owner of the vehicle 102. In some embodiments, an audible alert is provided to the occupants of the vehicle 102.

As another example, the parental controls option 1470 may be configured to provide options for the owner of the vehicle 102 to remotely monitor erratic movement of occupants of the vehicle 102. More specifically, the owner may be notified via SMS, email, telephone, etc., when the occupants of the vehicle are moving erratically. A seat detector in the vehicle 102 may detect the erratic movement and, if the erratic movement exceeded a predetermined threshold for intensity and/or frequency, the owner and/or occupants may be notified.

Yet another example of options that may be provided within the parental controls option 1470 is a smart monitoring seat belt detection option. Similar to the embodiments described above, the vehicle computing device 114 may communicate with the seatbelt sensor and/or occupancy sensor to determine whether the users of the vehicle are using seatbelts. If the vehicle computing device 114 determines that one or more of the vehicle users is not using their seatbelt, a notification may be sent and/or other actions may be performed. As may also apply to the embodiments above, in some embodiments, vehicle functionality may be enabled (e.g., interior camera) or disabled (e.g., radio volume), upon determining seatbelts are not fastened.

Also included are options for smart monitoring text detection. As an example, the owner of a vehicle may be provided with options for remote alerts (e.g., SMS, email, telephone calls, etc.) when one or more occupants in the vehicle are texting or otherwise utilizing a mobile device. Similarly, functionality in the vehicle may be enabled and/or disabled, as described above.

As an example, the communication device may receive cellular and/or data communications that are identified as a text originating from a user in the vehicle 102. This determination may be sent to the vehicle computing device, which may then communicate with one or more other input/output hardware 108 to alter the functionality as desired by the vehicle owner.

Also included are options for monitoring volume detection of a vehicle. As an example, embodiments disclosed herein may be configured for alerting the owner or occupant, enabling functionality, and/or disabling functionality of the vehicle 102 when a determination is made that the volume of the vehicle 102 exceeds a predetermined threshold. As an example, if the volume sensor determines that the volume inside the vehicle reaches a predetermined threshold, a signal may be sent to the vehicle computing device 114. The vehicle computing device may then facilitate altering functionality of the vehicle 102, as described above.

It should be understood that while the embodiments described above may be universal for all users of the vehicle 102, this is merely an example. In some embodiments, an identification of the users of the vehicle may be determined and the above-described functionality may be implemented based on the current users of the vehicle 102. Other embodiments are also contemplated.

Figure 15:
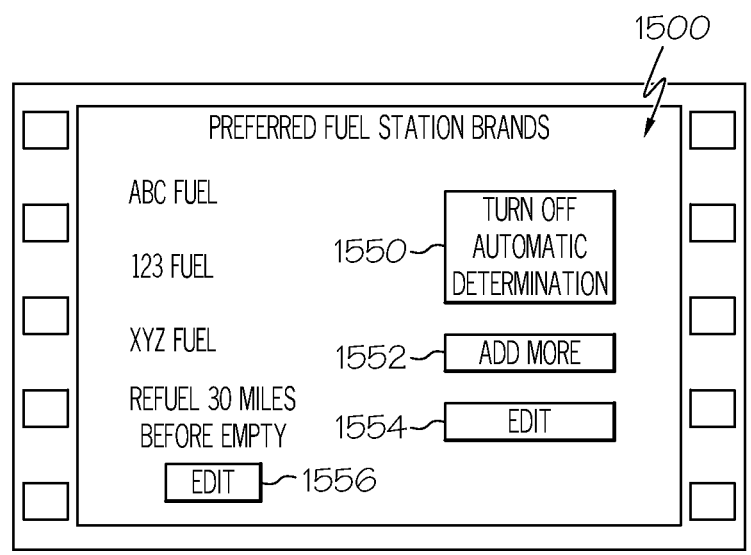
FIG. 15 depicts a vehicle preference interface for providing options for preferred fuel station brands, according to embodiments disclosed herein.

FIG. 15 depicts a vehicle preference interface 1500 for providing options for preferred fuel station brands, according to embodiments disclosed herein. The vehicle preference interface 1500 may be provided in response to selection of the fuel stations option 1462 in FIG. 14. More specifically, a plurality of fuel station brands are listed as being preferred fuel station brands for the user. The preferred fuel station brands may be determined by the user manually inputting the preferred fuel station brands directly into the vehicle computing device 114, the user computing device 170, and/or other computing device. Similarly, the preferred fuel station brands may be determined based on user actions.

Upon selection of the automatic determination option 1550, the vehicle computing device 114 may make determinations based on the user actions. As an example, if the user stops at an ABC fuel station (once or more than once), the vehicle computing device 114 may determine that this particular fuel station is preferred and/or this fuel station brand is a preferred fuel station brand.

More specifically, depending on the embodiment, a user may prefer a specific type of fuel station, such as XYZ brand fuel. The user may also prefer a particular fuel station location, such as the XYZ station on Main Street, but does not necessarily prefer all XYZ fuel stations. As such, embodiments disclosed herein may be configured to receive a user designation (or action) indicating either that the user has a preferred fuel station (or other way-point) brand or whether the user prefers a particular fuel station (or way-point). As a consequence, embodiments described herein that refer to a way-point brand may alternatively (or additionally) include an option for a particular way-point.

Similarly, the user may select an add more option 1552 and/or edit option 1554 to manually input the preferred fuel stations. Also included is an edit option 1556, which indicates when the user wishes to refuel. As with other options disclosed herein, the vehicle computing device 114 may determine the desired refuel level, based on past user actions. More specifically, the user can input "30 miles" to indicate that the user generally wishes to begin looking for refueling stations when the vehicle determines that there is about 30 miles worth of fuel left. The vehicle computing device 114 may then receive a signal from the fuel level sensor that indicates an approximate fuel level. The vehicle computing device 114 can additionally estimate the current fuel consumption and then calculate an estimated distance that the vehicle can travel before running empty on fuel.

Figure 16:
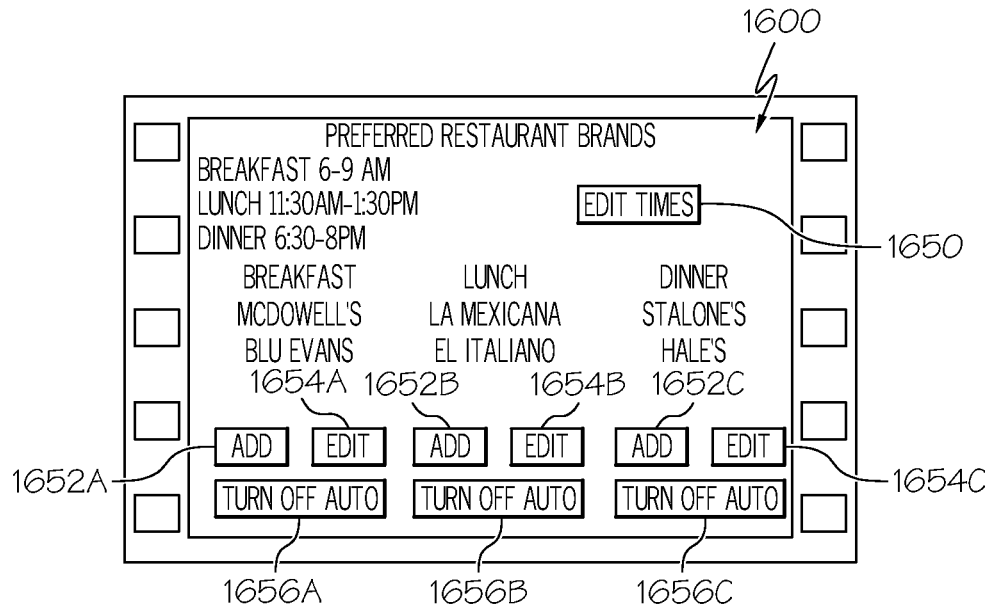
FIG. 16 depicts another vehicle preference interface for providing options for preferred restaurant brands, according to embodiments disclosed herein.

FIG. 16 depicts another vehicle preference interface 1600 for providing options for preferred restaurant brands, according to embodiments disclosed herein. The vehicle preference interface 1600 may be provided in response to a user selection of the restaurants option 1464 from FIG. 14. As illustrated, the user may have preferred restaurants and/or restaurant brands listed in the vehicle preference interface 1600. These preferred restaurants and/or restaurant brands may be categorized according to meal or other designation. Also provided in the vehicle preference interface 1600 is an edit times option 1650. The edit times option 1650 may provide the user with options to designate times that the user prefers to eat various meals. With this information, the vehicle computing device 114 may determine a location that the vehicle 102 may be when the preferred meal time arrives. This can allow the vehicle computing device 114 to suggest restaurants and/or schedule action items around these designated times.

Also included in the vehicle preference interface 1600 are add options 1652a, 1652b, and 1652c (collectively "1652"), edit options 1654a, 1654b, and 1654c (collectively (1654)), and turn off auto options 1656a, 1656b, and 1656c (collectively "1656"). The add options 1652 may provide the user with options to add additional preferred restaurants and/or restaurant brands. Selection of the edit options 1654 provides options to edit existing preferred restaurants and/or restaurant brands. Selection of the turn off auto options 1656 deactivates the automatic determination of the preferred restaurant and/or restaurant brands. More specifically, the vehicle computing device 114 may be configured to determine when a user stops and/or orders from a restaurant. The vehicle computing device 114 may then determine whether that restaurant and/or restaurant brand should be identified as a preferred restaurant and/or restaurant brand.

Figure 17:
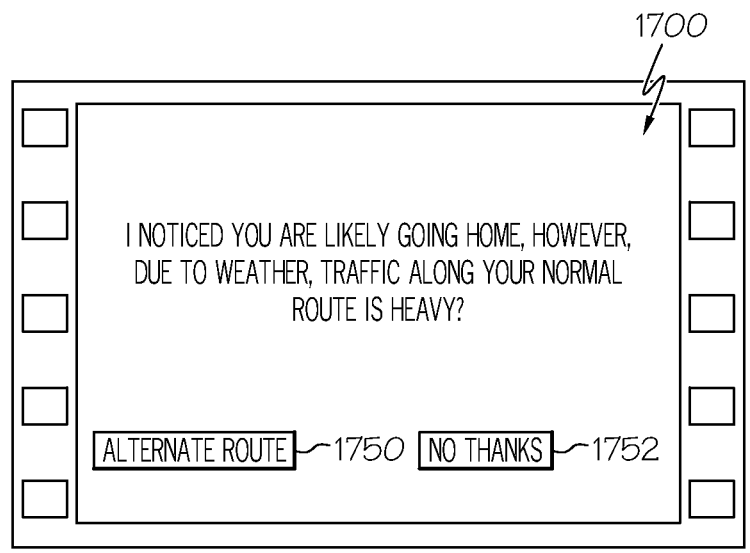
FIG. 17 depicts a vehicle weather interface for providing an alternate routing option, according to embodiments disclosed herein.

As an example, the user may enter a destination to the vehicle computing device 114. Based on the current location as determined by the vehicle GPS, the destination as entered by the user or determined by the vehicle computing device, the current time, and the current speed, the vehicle computing device 114 may determine an approximate location that the vehicle 102 will reach at the meal time. The vehicle may then determine whether there are preferred restaurant brands in that location. If so, the vehicle computing device 114 may also access third party data from the third party remote computing device 164 to determine when that restaurant will be open FIG. 17 depicts a vehicle weather interface 1700 for providing an alternate routing option, according to embodiments disclosed herein. More specifically, users often do not turn on vehicle routing when they are traveling to a known location. As such, oftentimes, the user is unaware of the most efficient route to that destination. Embodiments disclosed herein however may be configured to monitor destinations, weather, traffic, road conditions, etc. to suggest alternate routes that may be more efficient. As an example, a user may consistently leave home around 8:00 AM for work and take a similar route each day. The vehicle computing device 114 may utilize the vehicle GPS to determine and store the route taken. When the user again begins a similar route the next morning at approximately 8:00, the vehicle computing device 114 may recognize this common action. Thus, the vehicle computing device 114 may predict this route that the user is again taking the route to reach the usual destination. Because of this determination, the vehicle computing device 114 may suggest alternate routes, based on expected travel time, average speed, weather, traffic, road conditions, etc. Depending on the particular embodiment, the expected data may be retrieved from the third party remote computing device 164 and/or calculated locally. Accordingly, the vehicle weather interface 1700 may provide the user with an alternate route option 1750 for accepting the alternate route. Also included is a decline option 1752 for not implementing the alternate routing.

It should be understood that while weather prompted the vehicle weather interface 1700, this is merely an example. In some embodiments the vehicle computing device 114 may simply determine that a more efficient route may be taken. Similarly, other data may trigger the suggestion of an alternate route, including news, traffic, road conditions, etc.

Figure 18:
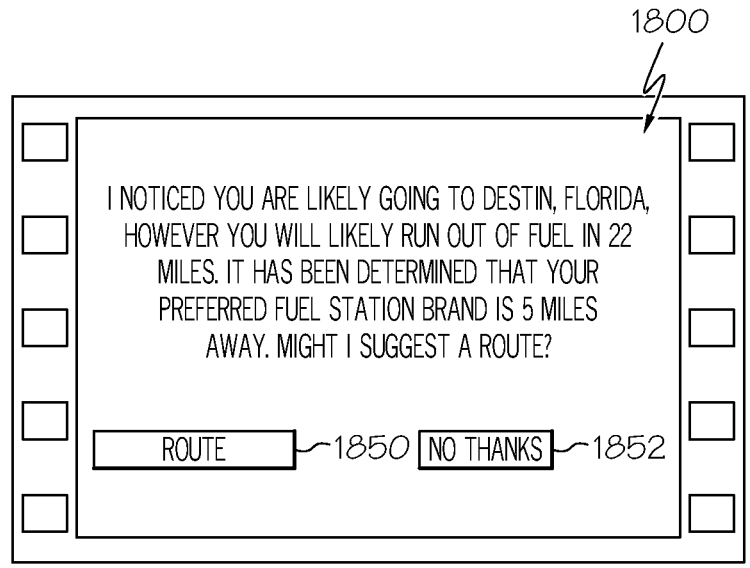
FIG. 18 depicts a vehicle fuel reminder interface for providing a routing option to a way-point, such as a fuel station, according to embodiments disclosed herein.

FIG. 18 depicts a vehicle fuel reminder interface 1800 for providing a routing option to a way-point, such as a fuel station, according to embodiments disclosed herein. As illustrated, the vehicle computing device 114 determined that the vehicle 102 is currently traveling to Destin, Fla. This determination may be made due to the user entering this destination into the vehicle computing device 114, from previous destinations, and/or from the vehicle computing device 114 accessing events on the user schedule. Regardless, by predicting and/or determining the desired destination and the current fuel consumption, the vehicle computing device 114 can predict a likely location where the vehicle 102 will deplete the fuel reserves. The vehicle computing device 114 may additionally utilize the designated settings (such as in FIG. 15) and the vehicle GPS to determine when the user will wish to refuel, as well as locate preferred fuel station brands in that area. The vehicle fuel reminder interface 1800 may thus provide a routing option 1850 for routing to one or more fuel stations. In response to selecting the routing option 1850, the vehicle computing device 114 may provide routing to the most desirable fuel station and/or provide another interface with options for the user to select among a plurality of potential fueling stations in that area.

Figure 19:
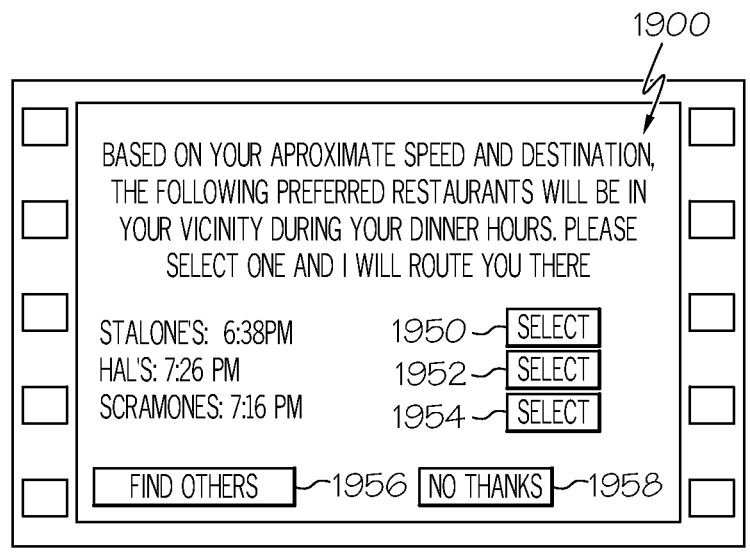
FIG. 19 depicts a vehicle restaurant reminder interface for providing a routing option to a way-point, such as a restaurant, according to embodiments disclosed herein.

FIG. 19 depicts a vehicle restaurant reminder interface 1900 for providing a routing option to a way-point, such as a restaurant, according to embodiments disclosed herein. Similar to the vehicle fuel reminder interface 1800, the vehicle restaurant reminder interface 1900 may be configured to recommend restaurants that will be in the vicinity of the vehicle 102 during a predetermined meal time. More specifically, the vehicle computing device 114 may utilize the vehicle GPS to determine a likely destination for the vehicle 102. Additionally, the vehicle computing device 114 may utilize the current location, current speed, destination, and/or other data to determine a likely area that the vehicle 102 will reach during the next meal time, as specified in FIG. 16. Based on this information, the vehicle computing device 114 may utilize the current time, the current location, the destination, and the approximate speed to determine which of the preferred restaurants and/or restaurant brands will be within that area. As illustrated, the vehicle restaurant reminder interface 1900 indicates that three restaurants are located in that area and provides a predicted time that the vehicle 102 will reach those restaurants, taking into account vehicle speed, traffic, weather, road conditions, etc. between the vehicle 102 and each restaurant. Thus, the user may select one of the determined restaurants in options 1950, 1952, or 1954. By selecting a find others option 1956, the vehicle computing device 114 may locate other restaurants that are preferred restaurant brands. Selection of a decline option 1958 may return to the vehicle menu interface 600 from FIG. 6.

It should be understood that with regard to the examples of FIGS. 18 and 19, the vehicle computing device 114 may further filter results of potential restaurants and/or fuel stations, based on other factors, such as operating hours and price. Instead of (or in addition to) specifying a fuel station brand, the user may specify a fuel price threshold. Thus, when determining the potential fuel stations for FIG. 18, the vehicle computing device 114 may access third party data from the third party remote computing device 164 to determine the price fuel is being sold from those fuel stations. Those fuel stations that exceed the price threshold may be filtered out of the results provided in FIG. 18.

Similarly, the vehicle computing device 114 may determine hours of operation of the way-point to determine whether the way-point will be open when the vehicle 102 reaches that location. Again, the vehicle computing device 114 may access third party data to determine hours of operation for the way-points that meet the criteria described with regard to FIGS. 18 and 19. Based on an expected time of arrival to those way-points, the vehicle computing device 114 may determine which way-points will be operational at that time. The vehicle computing device 114 may filter out the way-points that will not be operational at that time.

Figure 20:
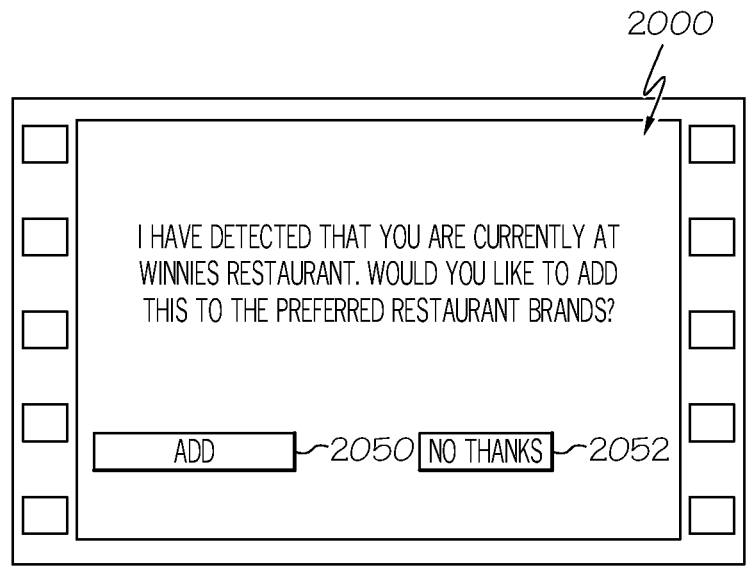
FIG. 20 depicts a vehicle way-point interface for providing a user option to add a way-point as a preferred restaurant brand, according to embodiments disclosed herein.

FIG. 20 depicts a vehicle way-point interface 2000 for providing a user option to add a way-point as a preferred restaurant brand, according to embodiments disclosed herein. As illustrated, the vehicle computing device 114 may utilize the vehicle GPS to determine whether the vehicle 102 stops at a restaurant, fuel station, service station, grocery store, and/or other way-point. In response to this determination, the vehicle computing device 114 may determine if the user wishes to add the way-point to one of the preferred way-points and/or preferred way-point brands. If so, the user may select a confirm option 2050. If not, the user may select a decline option 2052.

It should be understood that while the vehicle fuel reminder interface 1800 and the vehicle restaurant reminder interface 1900 are depicted as specific way points, these are merely examples. More specifically, any type of preferred way-point may be designated.

While the embodiments described above relate to in-vehicle interfaces, these are merely examples. More specifically, FIGS. 21-28 are related to web interfaces that may be provided via the user computing device 170. It should be understood, however, that the functionality provided in the vehicle interfaces may be provided in the web interfaces and vice versa.

Figure 21:
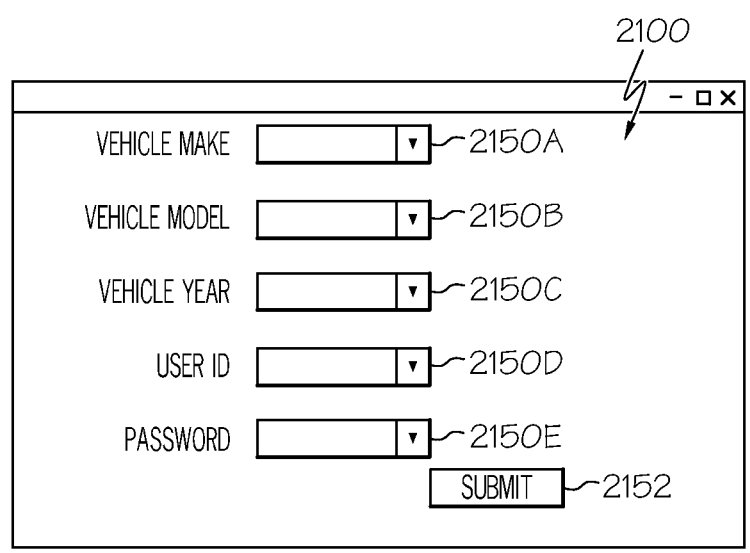
FIG. 21 depicts a web vehicle sign-in interface for providing vehicle information, according to embodiments disclosed herein.

FIG. 21 depicts a web vehicle sign-in interface 2100 for providing vehicle information, according to embodiments disclosed herein. As discussed above, the user computing device 170 and/or the mobile phone device 166 may be configured to access data from the remote computing device 162 via the internet and/or other wide area network. More specifically, in response to accessing a desired wide area network portal, the web vehicle sign-in interface 2100 may be provided. The web vehicle sign-in interface 2100 may include a vehicle make option 2150*a*, a vehicle model option 2150*b*, a vehicle year option 2150*c*, a user identification option 2150*d*, and a password option 2150*e*. The user may access the web vehicle sign-in interface 2100 and submit the requested information. For setting up and/or managing functional and/or non-functional aspect settings of the vehicle 102 and/or other vehicle. The user may select a submit option 2152 to proceed.

Figure 22:
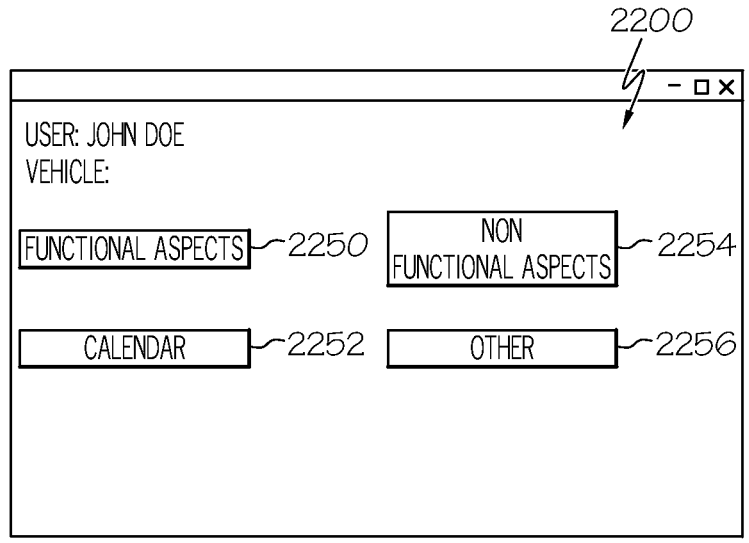
FIG. 22 depicts a web vehicle options interface for selecting one or more options for the vehicle, according to embodiments disclosed herein.

FIG. 22 depicts a web vehicle options interface 2200 for selecting one or more options for the vehicle 102, according to embodiments disclosed herein. In response to selecting the submit option 2152 from FIG. 21, the remote computing device 162 may provide the web vehicle options interface 2200, which includes a functional aspects option 2250, a calendar option 2252 for viewing a user calendar, a nonfunctional aspects option 2254, and an other option 2256.

Figure 23:
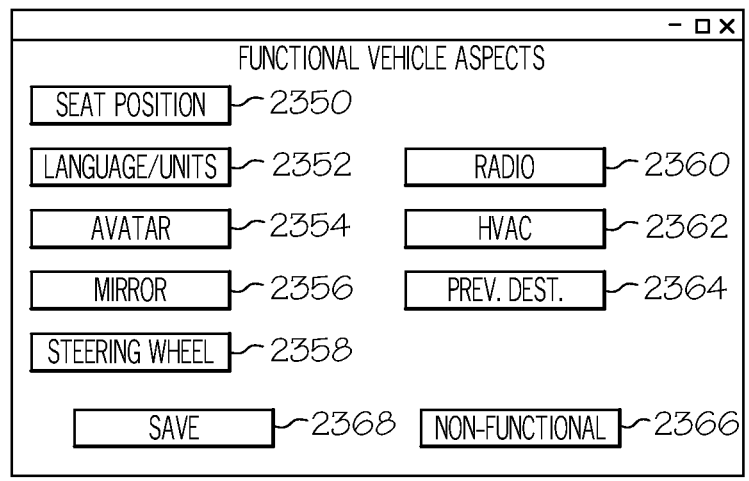
FIG. 23 depicts a web vehicle settings interface for providing options to one or more functional aspects of the vehicle, according to embodiments disclosed herein.

FIG. 23 depicts a web vehicle settings interface 2300 for providing options to one or more functional aspects of the vehicle 102, according to embodiments disclosed herein. In response to selection of the functional aspects option 2250, the web vehicle settings interface 2300 may be provided. As illustrated, the web vehicle settings interface 2300 may include a seat position option 2350, a language and units setting 2352, an avatar option 2354, a mirror option 2356, a steering wheel option 2358, a radio option 2360, an HVAC option 2362, and a previous destination option 2364. In response to selection of the seat position option 2350, the remote computing device 162 may provide seat position settings for a driver seat, passenger seat, etc. on the vehicle 102 and/or other vehicles.

As described above, these settings may be determined from a user adjusting a seat in the vehicle 102; the user manually inputting seat settings into the vehicle computing device 114; and/or the user manually inputting the seat settings into the remote computing device 162, such as via a web interface provided by the user computing device 170. Additionally, in response to selecting any of the options 2352-2364, other functional aspects of the vehicle 102 may be viewed and/or adjusted. Also included are a non-functional option 2366 and a save option 2368.

Figure 24:
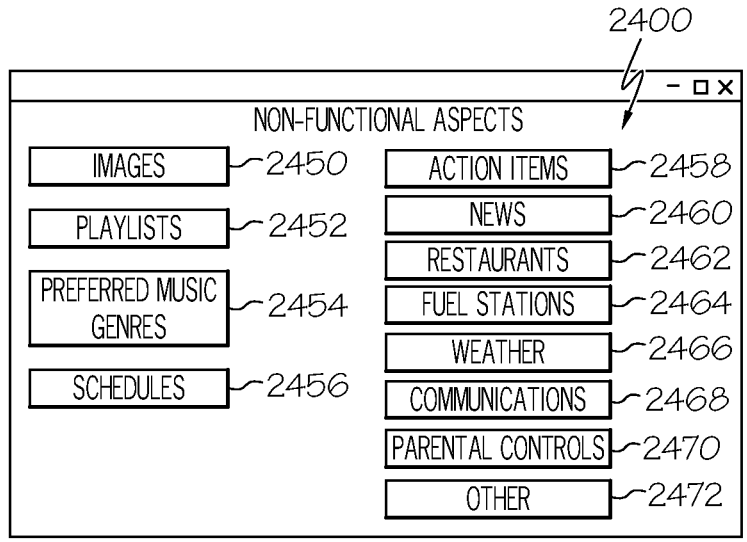
FIG. 24 depicts another web vehicle settings interface for providing options to one or more non-functional aspects of the vehicle, according to embodiments disclosed herein.

FIG. 24 depicts another web vehicle settings interface 2400 for providing options to one more non-functional aspects of the vehicle 102, according to embodiments disclosed herein. In response to selection of the non-functional aspects option 2366, non-functional aspects may be provided. In response to selection of the non-functional aspects option 2254 from FIG. 22, the web vehicle settings interface 2400 may be provided. As illustrated, the web vehicle settings interface 2400 includes an images option 2450, a playlists option 2452, a preferred music genres option 2454, a schedules option 2456, an action items list options 2458, a news option 2460, a restaurants option 2462, a fuel stations option 2464, a weather option 2466, a communications option 2468, a parental controls option 2470, and an other option 2472. More specifically, the communications option 2468 may provide options related to messaging and social media from the vehicle 102, as discussed with reference with FIG. 14. Similarly, in response to selection of the parental controls option 2470, one or more options for remotely monitoring and/or controlling the vehicle. Additionally, by selecting the parental controls option 2740, embodiments may be configured to provide options for setting the pre-set limits that trigger notification enabling functionality, and/or disabling functionality. As an example, limits may be set for top speed, occupancy level, radio volume, geo-fencing, etc. Additionally, in some embodiments, options for providing rewards for positive behavior.

Figure 25:
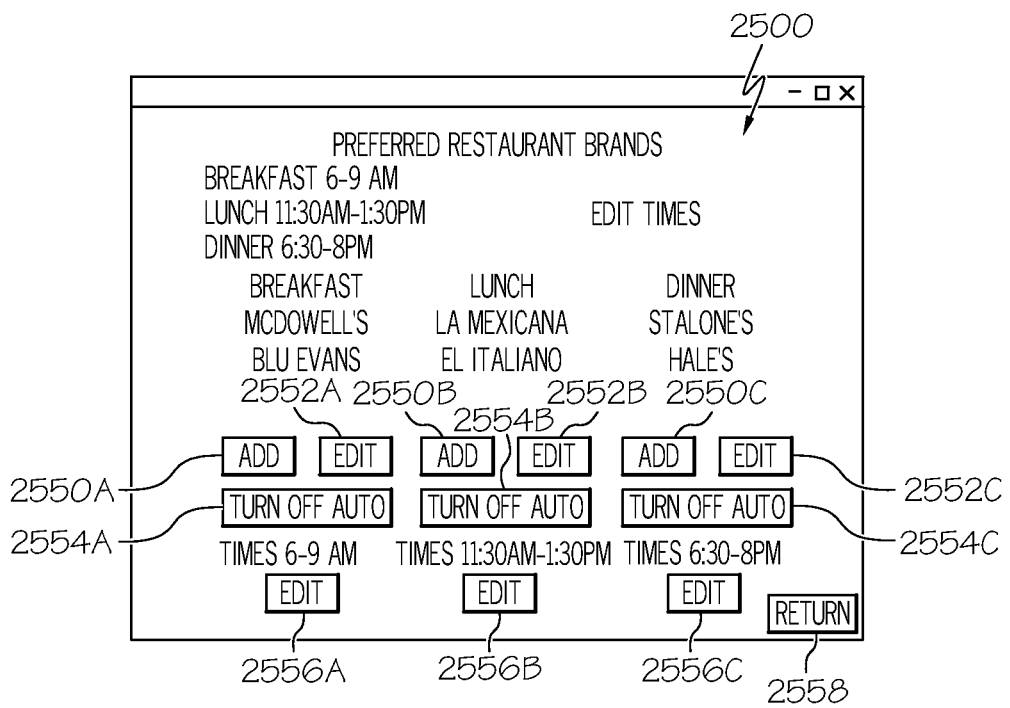
FIG. 25 depicts a web vehicle preferred way-point interface for providing options for a preferred restaurant brand, according to embodiments disclosed herein.

FIG. 25 depicts a web vehicle preferred way-point interface 2500 for providing options for a preferred restaurant brand, according to embodiments disclosed herein. In response to selection of the restaurants option 2462, the web vehicle preferred way-point interface 2500 may be provided by the remote computing device 162. As illustrated, the web vehicle preferred way-point interface 2500 includes add options 2550*a*, 2550*b*, and 2550*c* (collectively "2550"), edit options 2552*a*, 2552*b*, and 2552*c* (collectively ("2552"), and turn off auto options 2554*a*, 2554*b*, and 2554*c* (collectively "2554"). The add options 2550 allow the user to add additional restaurants and/or restaurant brands to the preferred restaurants depicted in FIG. 25. The edit options 2552 allow the user to edit the restaurants and/or restaurant brands the preferred restaurants depicted in FIG. 25. The turn off auto options 2554 allow the user to deactivate the automatic determination of preferred restaurants, based on the vehicle computing device 114 receiving a signal from the vehicle GPS indicating that the vehicle 102 has arrived at a restaurant.

Also included in the web vehicle preferred way-point interface 2500 are time edit options 2556*a*, 2556*b*, and 2556*c* (collectively "2556"). The time edit options 2556 may be provided the user with options to edit the desired time for each meal and/or add additional meals. The return option 2558 returns the user to the web vehicle settings interface 2400 from FIG. 24.

Figure 26:
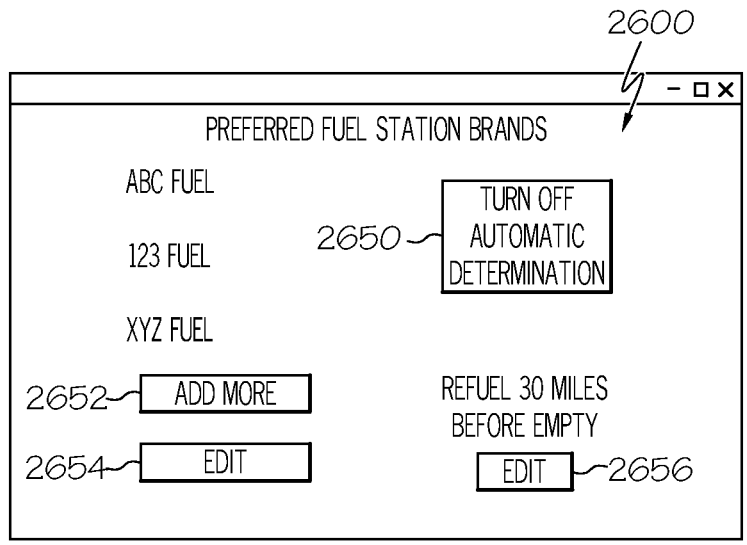
FIG. 26 depicts another vehicle preferred way-point interface for providing options for a preferred fuel station, according to embodiments disclosed herein.

FIG. 26 depicts another vehicle preferred way-point interface 2600 for providing options for a preferred fuel station, according to embodiments disclosed herein. The vehicle preferred way-point interface 2600 may be provided in response to selection of the fuel stations option 2464. As illustrated, the vehicle preferred way-point interface 2600 may provide preferred fuel stations and/or preferred fuel station brands. The vehicle preferred way-point interface 2600 may include a deactivate option 2650 for deactivating the automatic determination of preferred fuel stations based on a vehicle location. Also included is an add more option 2652 for adding additional fuel stations and/or fuel station brands and an edit option 2654 for editing the current fuel stations and/or fuel station brands. An edit option 2656 may be provided for editing the threshold distance that the vehicle 102 can travel before depleting the fuel reserves that will trigger refueling reminders.

Figure 27:
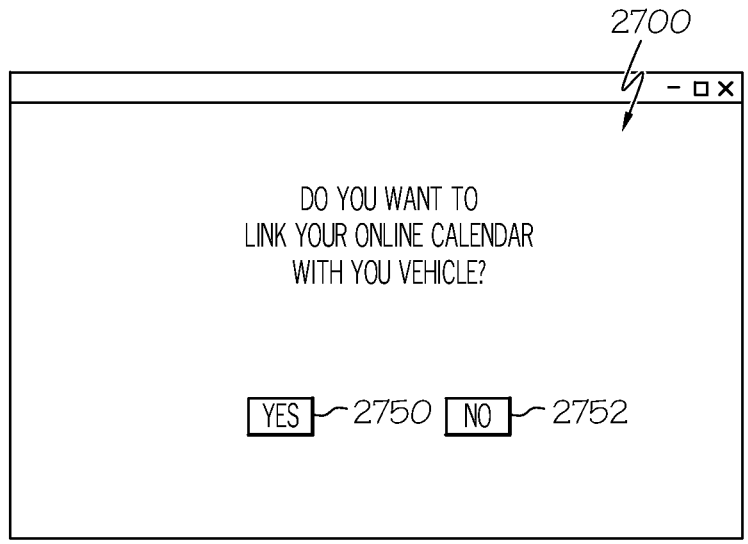
FIG. 27 depicts a web vehicle schedule interface for linking a remotely stored user schedule with the vehicle, according to embodiments disclosed herein.

FIG. 27 depicts a web vehicle schedule interface 2700 for linking a remotely stored user schedule with the vehicle, according to embodiments disclosed herein. In response to selection of the schedule option 2456, the web vehicle schedule interface 2700 may be provided. As illustrated, the web vehicle schedule interface 2700 may request whether the user wishes to link a remote schedule with the vehicle 102. Also included are a link option 2750 and a decline link option 2752. In response to linking the remote schedule with the vehicle 102, the vehicle computing device 114 may utilize the schedule for event reminders, routing, and/or other actions as described herein.

It should be understood that while FIGS. 26 and 27 depict restaurants and fuel stations as way-points, these are merely examples. More specifically, any type of way-point may be utilized and configured in a similar manner. Examples include service stations, grocery stores, pharmacies, rest stops, etc.

Figure 28:
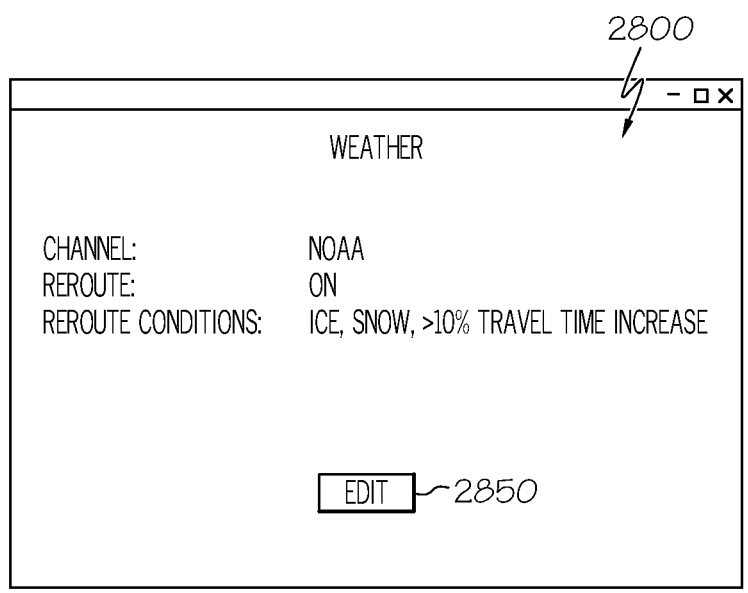
FIG. 28 depicts a web vehicle weather interface for providing weather options for the vehicle, according to embodiments disclosed herein.

FIG. 28 depicts a web vehicle weather interface 2800 for providing weather options for the vehicle 102, according to embodiments disclosed herein. In response to selection of the weather option 2466 from FIG. 24, the web vehicle weather interface 2800 may be provided. The web vehicle weather interface 2800 may include data regarding weather conditions that the user has designated as a reason for the vehicle computing device 114 to suggest an alternate route. Also included is an edit option 2850 for editing the depicted conditions and options.

While FIGS. 21-28 are directed to web interfaces, FIGS. 29-40 are directed to various processes that may be performed using the vehicle computing device 114. Specifically, FIGS. 29-33 depict processes for determining an authorized user, as discussed with regard to the vehicle interfaces depicted in FIGS. 4, 5, 13-14, and 23-25, among others.

Figure 29:
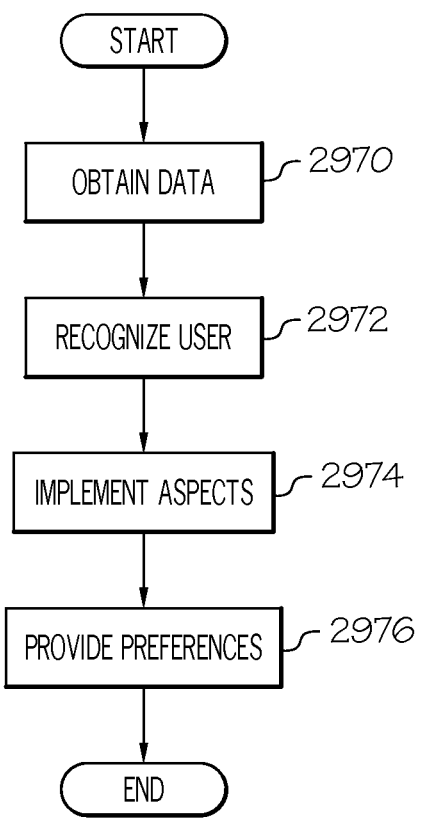
FIG. 29 depicts a flowchart for providing customized communication with an authorized vehicle user, according to embodiments disclosed herein.

FIG. 29 depicts a flowchart for providing customized communication with an authorized vehicle user, according to embodiments disclosed herein. As illustrated in block 2970, user preferences and authorization information relating to a mobile phone device and third party data may be obtained. In block 2972, a particular user may be recognized upon approach to a vehicle with the authorized mobile phone device. In block 2974, user preferences related to functional and non-functional aspects of the vehicle may be implemented. In block 2976, customized interactive communication with the authorized user based on stored user preferences and third party information may be provided.

Figure 30:
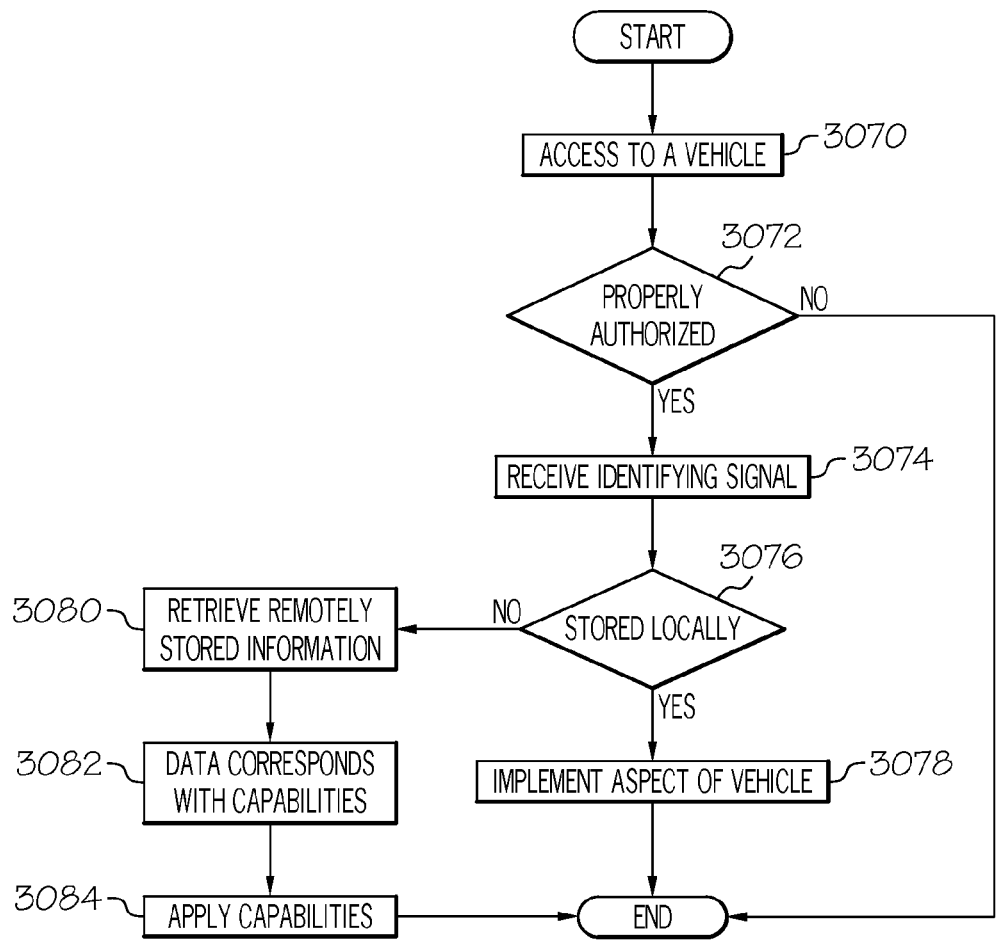
FIG. 30 depicts a flowchart for adjusting functional and/or non-functional aspects of a vehicle, according to embodiments disclosed herein.

FIG. 30 depicts a flowchart for adjusting functional and/or non-functional aspects of a vehicle, according to embodiments disclosed herein. As illustrated in block 3070, a signal for access to a vehicle may be received from a first device. In block 3072, a determination may be made regarding whether the first device properly authorized access to the vehicle. If the first device did not provide proper authentication, the process may end. If the first device did provide proper authentication, access may be granted. In block 3074, an identifying signal may be received from a second device, where the second device is different than the first device. In block 3076, a determination may be made regarding whether the authenticating user identifier is stored locally. If the user identifier is stored locally, in block 3078, the authenticating user identifying may be retrieved and utilized to implement one or more functional and non-functional aspects of the vehicle. If the user identifier is not stored locally, in block 3080, the remotely stored information may be retrieved. In block 3082, a determination may be made regarding whether the user configuration data corresponds with vehicle capabilities. In block 3084, the user configuration data that corresponds with the vehicle capabilities may be applied to adjust functional and non-functional aspects of the vehicle.

Figure 31:
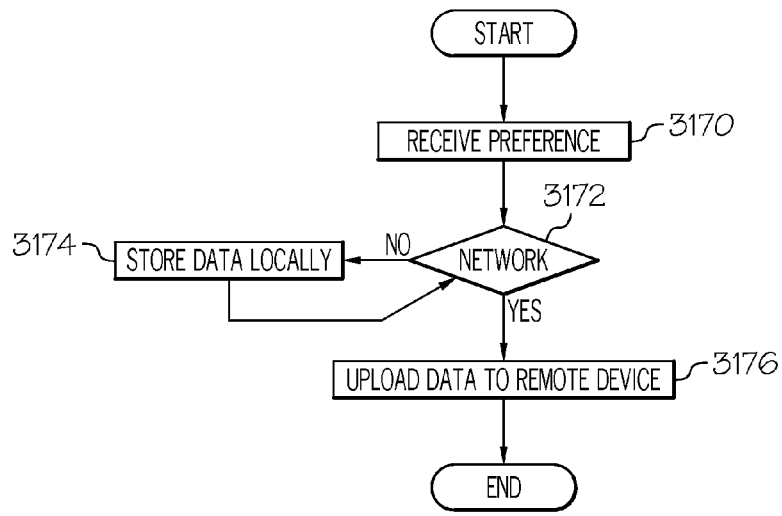
FIG. 31 depicts a flowchart for uploading user preference data from a vehicle to a remote computing device, according to embodiments disclosed herein.

FIG. 31 depicts a flowchart for uploading user preference data from a vehicle to a remote computing device, according to embodiments disclosed herein. As illustrated in block 3170, user preferences for a vehicle may be received. In block 3172, a determination may be made regarding whether the vehicle currently maintains a network connection. If not, in block 3174, the data may be stored locally and the process may return to block 3172. If a network connection is available, in block 3176, user preference data may be uploaded to a remote computing device.

Figure 32:
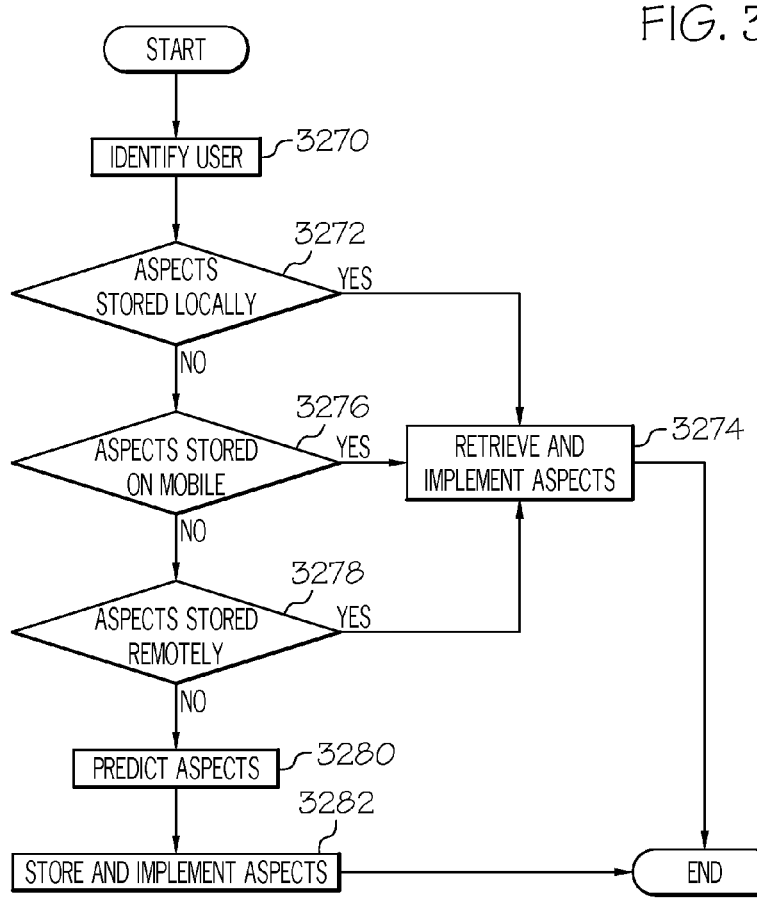
FIG. 32 depicts a flowchart for implementing a functional and/or non-functional aspect of the vehicle, according to embodiments disclosed herein.

FIG. 32 depicts a flowchart for implementing a functional and/or non-functional aspect of the vehicle, according to embodiments disclosed herein. As illustrated in block 3270, a user identify may be identified from a mobile device. In block 3272, a determination may be made regarding whether functional and non-functional aspects of the vehicle are stored locally. If so, in block 3274, the functional and non-functional aspects of the vehicle may be retrieved and implemented. If not, in block 3276, a determination may be made regarding whether the functional and non-functional aspects of the vehicle are stored on a mobile device. If so, the process may proceed to block 3274. If not, in block 3278 a determination may be made regarding whether the functional and non-functional aspects of the vehicle are stored remotely. If so, the process proceeds to block 3274. If not, in block 3280, the user actions may be utilized to predict functional and non-functional aspects of the vehicle. In block 3282, the functional and non-functional aspects of the vehicle may be stored and implemented.

Figure 33:
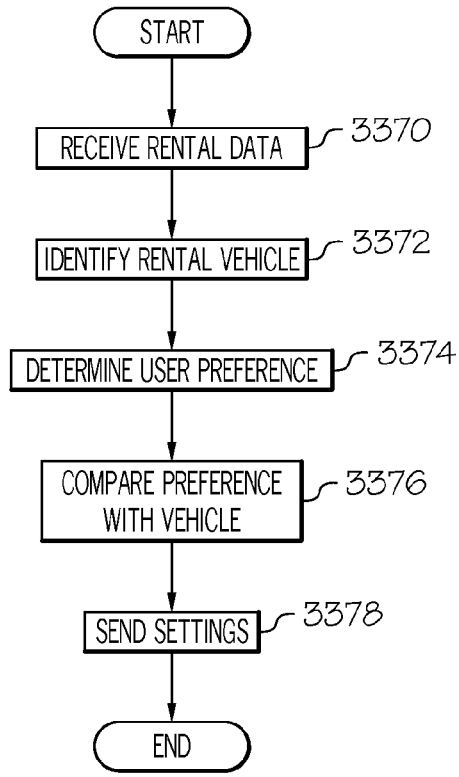
FIG. 33 depicts a flowchart for sending user settings to a rental vehicle, according to embodiments disclosed herein.

FIG. 33 depicts a flowchart for sending user settings to a rental vehicle, according to embodiments disclosed herein. More specifically, embodiments disclosed herein may be configured for remote storage of the functional and/or non-functional aspects of a vehicle, such that when the user accesses a second vehicle, such as a rental vehicle, the user preferences are already applied to the second vehicle. As illustrated in block 3370, rental data related to a rental agreement for a rental vehicle may be received and stored, where the rental data includes a first copy user identifier. As an example, if a user decides to rent a vehicle, she may sign up online, place a phone call, and/or visit a rental facility. Regardless, the user may provide the requested rental information, as well as a user identifier for accessing her vehicle preferences.

In block 3372, an identification of the rental vehicle that is subject to the rental agreement may be received and stored, where some point in the rental process, a vehicle will be assigned to the user. Depending on the particular rental company, the vehicle will be assigned when the user signs the rental agreement or when the user actually retrieves the rental vehicle. In block 3374, the user preference data may be determined for the user. In block 3376, the user preference data may be compared with vehicle capability date for the rental vehicle to determine a setting for a functional aspect of the rental vehicle and a setting for a non-functional aspect of the rental vehicle. More specifically, the user preference data may be related to the user's own vehicle or to a generic vehicle. Because the user preference data may include functional and/or non-functional aspects the rental vehicle may not accommodate, a comparison may be performed to determine which aspects may be applied to the rental vehicle. In block 3378, the settings and/or the first copy user identifier may be sent to the rental vehicle for implementation. More specifically, when the user approaches the rental vehicle, the user may have a user communication device, such as the mobile phone device 166. The user communication device may send a second copy user identifier to the rental vehicle. The rental vehicle (and/or the remote computing device 162 may authenticate the user by comparing the first copy user identifier and the second copy user identifier. Upon the user being authenticated, the settings may be applied to the rental vehicle.

Figure 34:
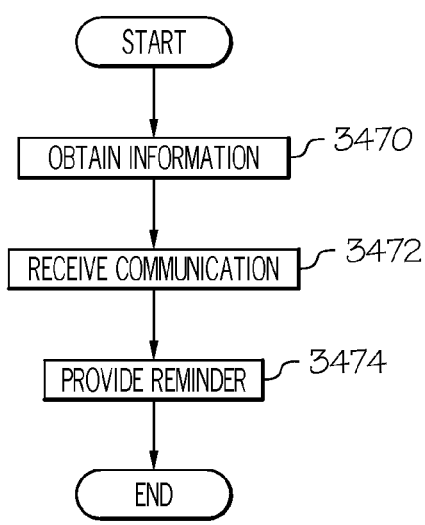
FIG. 34 depicts a flowchart for an event reminder, according to embodiments disclosed herein.
Figures 35, 36:
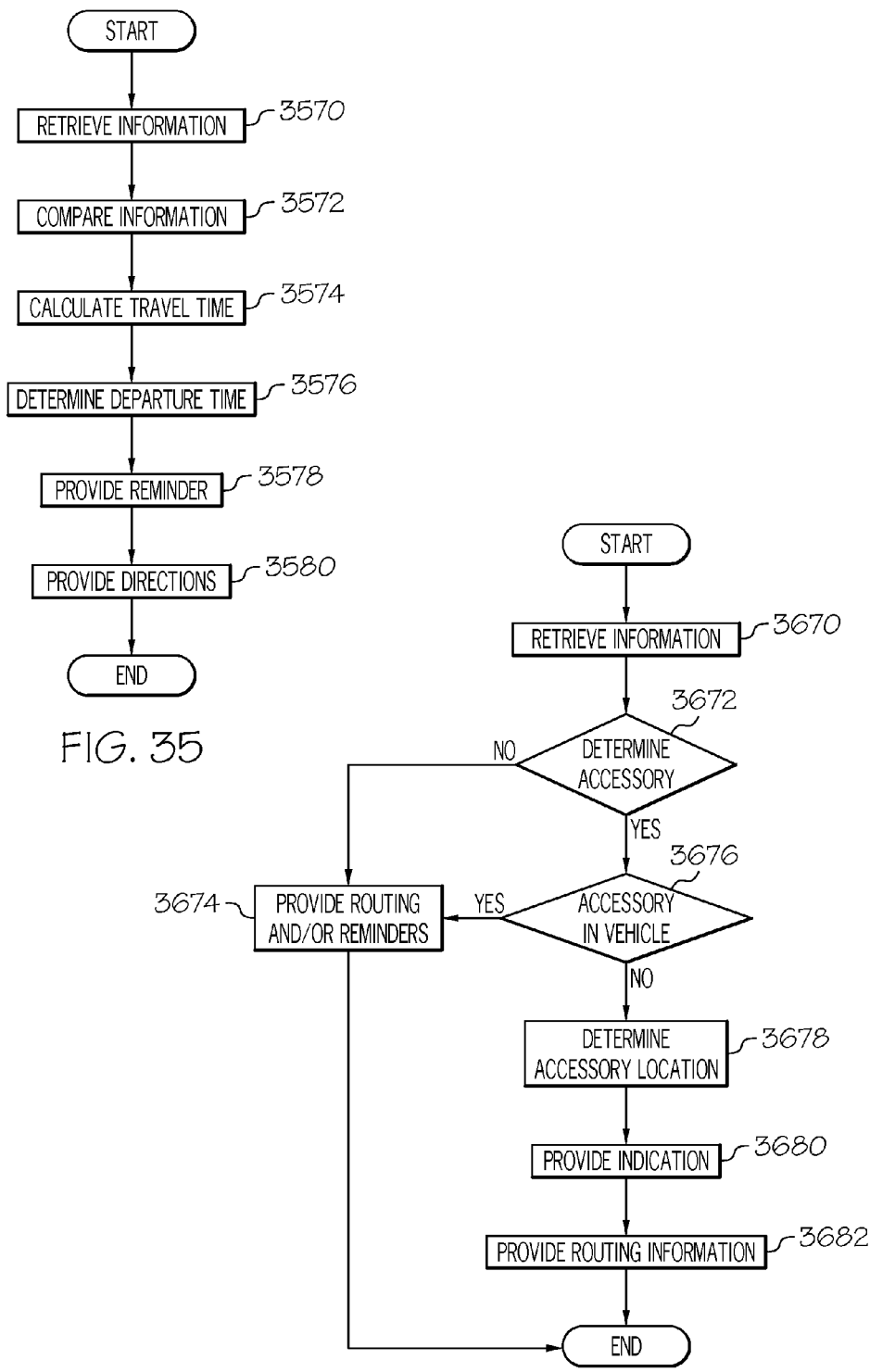
FIG. 35 depicts a flowchart for providing routing to a predetermined location, according to embodiments disclosed herein.
FIG. 36 depicts a flowchart for providing routing information to an accessory that is related to an event, according to embodiments disclosed herein.

While FIGS. 29-33 describe processes that may be utilized for determining functional and non-functional aspects of the vehicle 102, storing and uploading data to a network, and utilizing customized preferences for a rental vehicle, FIGS. 34-36 are directed to embodiments for event scheduling and routing. More specifically, FIGS. 34-36 describe embodiments that are related to the interfaces depicted in FIGS. 6-12 and 27, among others.

FIG. 34 depicts a flowchart for an event reminder, according to embodiments disclosed herein. As illustrated in block 3470, information related to user preferences, a user schedule, and third party information may be obtained. In block 3472, a communication may be received directly from a vehicle computing device, the communication including authenticating information for a user. In block 3474, in response to authenticating the user, a reminder may be automatically provided for an event on the user schedule a predetermined time prior to the event.

FIG. 35 depicts a flowchart for providing routing to a predetermined location, according to embodiments disclosed herein. As illustrated in block 3570, remotely stored schedule information for a user may be retrieved, where the remotely stored schedule information includes an upcoming event that is scheduled at a future time and at a predetermined location. In block 3572, the schedule information may be compared to a current time and a current vehicle location. In block 3574, a travel time to the predetermined location from the current vehicle location may be calculated. In block 3576, a determination may be made from the travel time, regarding a preferred time for departure to reach the upcoming event before the future time. In block 3578, a reminder of the upcoming event may be provided at a predetermined time before the preferred time for departure. In block 3580, driving directions may be provided to the predetermined location from the current vehicle location.

FIG. 36 depicts a flowchart for providing routing information to an accessory that is related to an event, according to embodiments disclosed herein. As illustrated in block 3670, schedule information may be received by a vehicle for an upcoming event and an event location. In block 3672, a determination may be made regarding whether the upcoming event includes an accessory. If not, at block 3674, routing and/or reminders maybe provided for the upcoming event. If an accessory is associated with the upcoming event, at block 3676, a determination may be made regarding whether the accessory is currently located in the vehicle. If so, the process may proceed to block 3674. If the accessory is not currently in the vehicle, in block 3678, an accessory location may be determined for the accessory. As discussed above, the accessory location may be determined via a satellite tracking identifier, through a user input, through past user actions, etc. In block 3680, in response to determining that the accessory is not currently located in the vehicle, an indication may be provided to the user that the accessory is missing and an option may be provided for routing to the accessory location. In block 3682, in response to receiving user input for routing to the accessory location, routing information is provided to the accessory location and, after the vehicle arrives at the accessory location; routing guidance to the event location is provided.

While FIGS. 34-36 are directed to processes for scheduling and/or routing the vehicle 102 to appointments and/or action items, FIGS. 37-40 are directed to embodiments related to determining providers. More specifically, FIGS. 37-40 are directed to processes that may be implemented by the vehicle computing device 114 while utilizing the interfaces depicted in FIGS. 15-20 25, and/or 26, among others.

Figure 37:
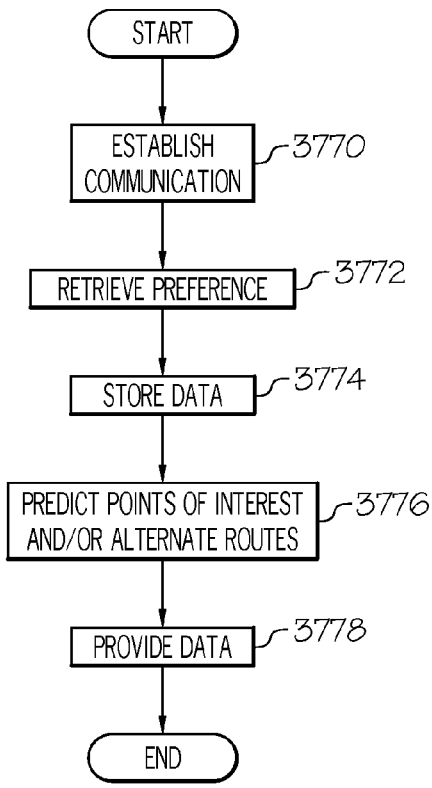
FIG. 37 depicts a flowchart for providing a likely point of interest and/or alternate route to a user, according to embodiments disclosed herein.

FIG. 37 depicts a flowchart for providing a likely point of interest and/or alternate route to a user, according to embodiments disclosed herein. As illustrated in block 3770, a communication may be established with a plurality of third party data storage units. In block 3772, at least one remotely stored user preference for a vehicle may be retrieved. In block 3774, storage of past locations and/or routes traveled may be facilitated. In block 3776, the past locations and/or routes traveled may be utilized to predict likely points of interest and/or alternate routes. In block 3778, the likely points of interest and/or the alternate routes may be provided to the user.

Figure 38:
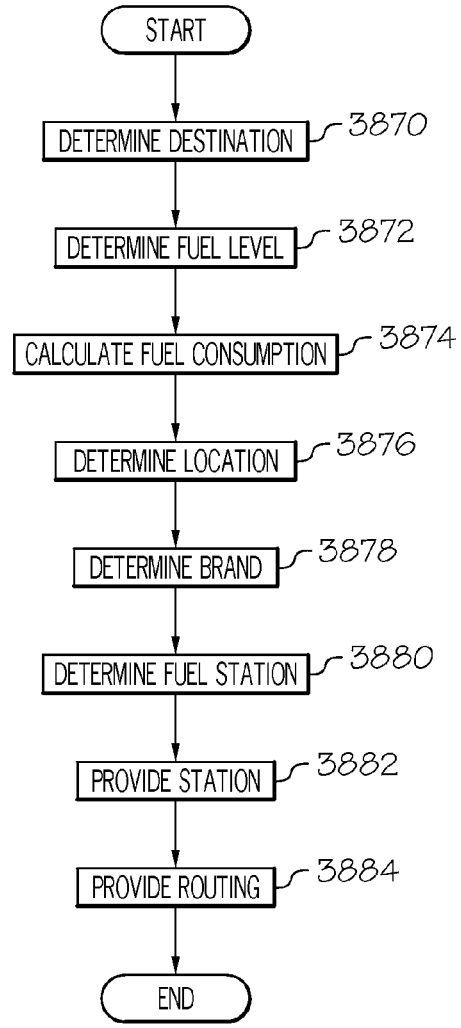
FIG. 38 depicts a flowchart for providing vehicle routing to a way-point, such as a fuel station, according to embodiments disclosed herein.

FIG. 38 depicts a flowchart for providing vehicle routing to a way-point, such as a fuel station, according to embodiments disclosed herein. As illustrated in block 3870, a destination of a vehicle may be determined. In block 3872, a fuel level of the vehicle may be determined, such as from the fuel level sensor. In block 3874, a fuel consumption level of the vehicle may be calculated, such as from a fuel level sensor. More specifically, the vehicle computing device 114 may receive fuel level indications from a fuel level sensor and utilize that information over a predetermined time to determine the current fuel level consumption. In block 3876, a location on the route where the fuel level will likely pass below a predetermined threshold may be determined. This may be determined utilizing the current fuel level, the current fuel consumption, a current location (as determined by the vehicle GPS), and the destination (as determined by the vehicle GPS). In block 3878, a preferred fuel station brand may be determined for the user. In block 3880, a fuel station that is the preferred fuel station brand and is within a predetermined distance from the location may be determined. More specifically, once the likely area that the vehicle will run low on fuel is determined, the vehicle computing device can utilize GPS and/or third party data to determine the available fuel providers in that area. With the available fuel providers, the vehicle computing device 114 may determine which of those are one of the user's preferred fuel station brands. In block 3882, the fuel station may be provided to the user, as well as an option to route the vehicle to the fuel station. In block 3884, vehicle routing to the fuel station may be provided to the vehicle, such as via the vehicle GPS.

Figure 39:
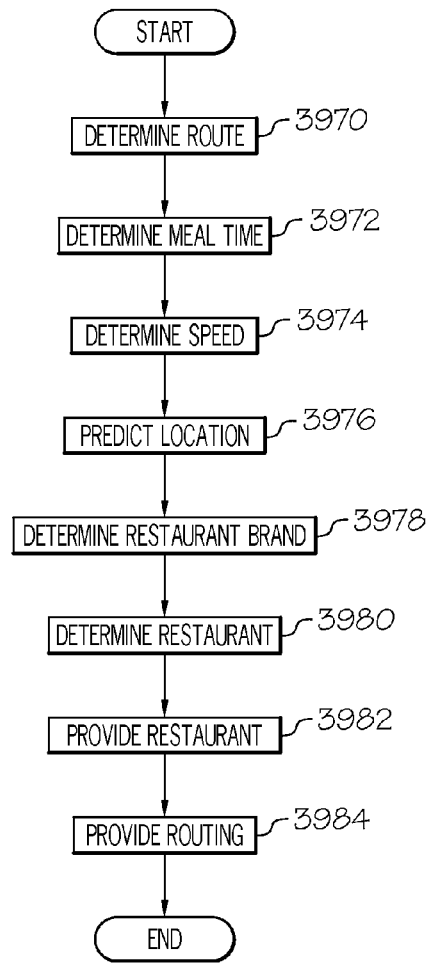
FIG. 39 depicts a flowchart for providing vehicle routing to a way-point, such as a restaurant, according to embodiments disclosed herein.

FIG. 39 depicts a flowchart for providing vehicle routing to a way-point, such as a restaurant, according to embodiments disclosed herein. As illustrated in block 3970, a route to a destination may be determined for a vehicle, such as via a vehicle GPS. In block 3972, a desired meal time may be determined. As discussed above, the desired meal time may be determined via a user input and/or previous user actions. As an example, if the vehicle computing device 114 determines that the user generally stops at a restaurant (as indicated by the vehicle GPS) between 6:00 PM and 7:00 PM, the vehicle computing device 114 may determine that the user's preferred dinner time is between 6:00 PM and 7:00 PM. In block 3974 an approximate speed of the vehicle may be determined.

In block 3976, an approximate location for the vehicle at the desired meal time may be predicted. As discussed above, based on the current location (as determined by the vehicle GPS), time, destination, and approximate speed, the vehicle computing device 114 may determine an approximate destination that the vehicle will reach at the determined meal time. In block 3978, a preferred restaurant brand may be determined for the user. In block 3980, a restaurant may be determined along the route that is the preferred restaurant brand and is a distance from the vehicle such that the vehicle would arrive at the restaurant within a predetermined time of the desired meal time. As discussed above, the preferred restaurant brand may be determined from a user designation and/or via historical user actions. Regardless, once the vehicle computing device 114 determines the likely location of the vehicle 102 at the determined meal time, the vehicle computing device 114 may determine if any restaurants are in that area that are of the preferred restaurant brand. In block 3982, the restaurant may be provided to the user, as well as an option to route the vehicle to the restaurant. In block 3984, vehicle routing to the restaurant may be provided.

Figure 40:
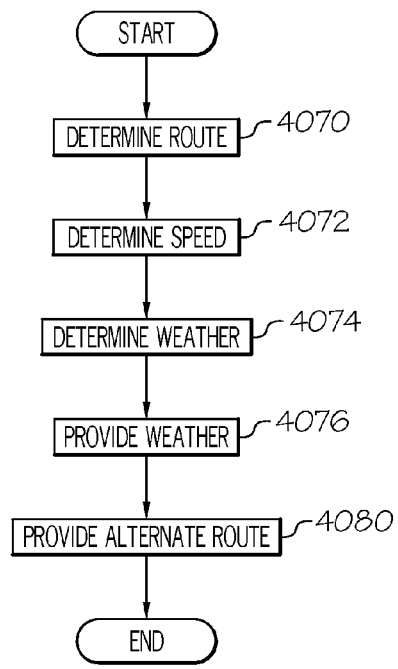
FIG. 40 depicts a flowchart for providing an alternate vehicle route due to weather, according to embodiments disclosed herein.

FIG. 40 depicts a flowchart for providing an alternate vehicle route due to weather, according to embodiments disclosed herein. As illustrated in block 4070, a route for a vehicle may be determined. In block 4072, an approximate speed for the vehicle may be determined, such as using the vehicle speedometer. In block 4074, weather condition data along the route may be determined. More specifically, the vehicle GPS and/or vehicle computing device 114 may determined as described above. The vehicle computing device 114 may additionally access the third party remote computing device 164 to access weather data at one or more points between the current location of the vehicle 102 and the destination. A determination may additionally be made by the remote computing device 114 regarding whether there are any weather conditions along the route that would affect travel to the destination. In block 4076, in response to determining that the weather conditions will affect the vehicle, an indication of the weather conditions may be provided to the user, as well as a user option for providing an alternate route for the vehicle. In block 4080, in response to receiving user input, the alternate route may be provided to the user.

As illustrated above, various embodiments for providing user access to a vehicle; providing a vehicle smart calendar; and determining available providers are disclosed. As a consequence, embodiments disclosed herein may be configured to uniquely identify a user that is accessing a vehicle, regardless of who the primary driver of that vehicle is. Additionally, because the vehicle may be configured to communicate directly with a remote computing device (cloud storage device), a remotely stored user schedule may be accessed by the vehicle without utilizing a bridging device, such as a mobile phone using a mobile network. Because of this, embodiments may be configured to easily provide user events and action items, as well as provide dynamic routing based on third party data, such as weather, traffic, road conditions, etc. Further embodiments may also be configured to predict a destination without the user turning on a routing function in the vehicle. Because of this, the vehicle may be able to determine whether a more efficient route is available to the user without the user having to manually activate the routing function in the vehicle. Additionally, some embodiments may be configured to determine preferred way-points along a route and predict the next stopping point for the vehicle. As some embodiments may utilize third party data, such as price data, operating hours, etc., the user will not risk searching for a way-point in an area where none are available. Other embodiments are also described.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for estimating a temperature calibration. As discussed above, such embodiments are configured to determine a dynamic smoothing value, which may be based on vehicle speed, coolant temperature, and/or other criteria. It should also be understood that these embodiments are merely exemplary and are not intended to limit the scope of this disclosure.

What is claimed is:

1. A method for communicating with a vehicle user comprising:
    obtaining a user preference and authorization information relating to a mobile phone device and third party information, the mobile phone device being authorized by a vehicle computing device of a vehicle and identifying a particular user;
    recognizing a vehicle access device carried by the particular user;
    in response to recognizing the vehicle access device, providing access to the vehicle;
    recognizing the particular user upon approach with the mobile phone device;
    implementing the user preference for the particular user, the user preference comprising a setting for a functional aspect of the vehicle and a setting for a non-functional aspect of the vehicle, wherein the setting for the non-functional aspect includes user calendar integration to communicate user calendar events of a remotely stored user calendar to the vehicle, wherein implementing the user preference comprises determining an upcoming event on the user calendar is associated with an accessory; and
    providing, by the vehicle computing device, customized interactive communication with the particular user, based on stored user preferences, the user calendar, and third party information.

2. The method of claim 1, further comprising:
    recognizing a second user upon approach with a second mobile phone device, the second mobile phone device being authorized by the vehicle computing device and identifying the second user;
    implementing the user preference for the particular user;
    determining which of the particular user and the second user is a driver of the vehicle,
    wherein in response to determining that the particular user is the driver, the user preference is implemented, and
    wherein in response to determining that the second user is the driver, implementing a user preference of the second user.

3. The method of claim 1, wherein the functional aspect of the vehicle comprises at least one of the following: a seat position setting, a language setting, a units setting, an avatar setting, a mirror position setting, a steering wheel setting, a radio setting, a heat ventilation air conditioning (HVAC) system setting, and a previous destination setting.

4. The method of claim 1, wherein the non-functional aspect of the vehicle further comprises at least one of the following: an image setting, a playlist setting, a preferred music setting, an action item setting, a news setting, and a way-point setting.

5. The method of claim 1, further comprising receiving a request for access to the vehicle from a vehicle access device, wherein in response to receiving the request for access to the vehicle and recognizing the particular user, the user preference is implemented.

6. The method of claim 1, wherein the vehicle is a rental vehicle and wherein the user preference is obtained from a remote computing device.

7. The method of claim 1, wherein the user preference is stored on at least one of the following: the vehicle computing device, on the mobile phone device, and on a remote computing device.

8. The method of claim 1, wherein implementing the user preference further comprises, in response to determining that the upcoming event is associated with the accessory, determining whether the accessory is currently in the vehicle.

9. The method of claim 8, wherein implementing the user preference further comprises, in response to determining that the accessory is not currently located in the vehicle, determining a location of the accessory.

10. A system for communicating with a vehicle user comprising:
    a memory component that stores logic that, when executed by the system, causes the system to perform at least the following:
        receive, by a remote computing device, data related to a rental agreement for a rental vehicle, the data comprising a first copy user identifier;
        receive, by the remote computing device, an identification of the rental vehicle that is subject to the rental agreement;
        receive, by the remote computing device, a request for the first copy user identifier from the rental vehicle;
        provide, by the remote computing device, the first copy user identifier to the rental vehicle;
        receive, by the remote computing device, a second copy user identifier from the rental vehicle, the second copy user identifier being initially received by the rental vehicle from a user communication device carried by the particular user;
        authenticate, by the remote computing device, the second copy user identifier, wherein the rental vehicle also authenticates the second copy user identifier by comparing the first copy to the second copy;
        determine, by the remote computing device, user preference data for a particular user;
        compare, by the remote computing device, the user preference data with vehicle capability data to determine a setting for a functional aspect of the rental vehicle and a setting for a non-functional aspect of the rental vehicle; and in response to authenticating the second copy user identifier, send, by the remote computing device, the settings to the rental vehicle.

11. The system of claim 10, wherein the functional aspect of the rental vehicle comprises at least one of the following: a seat position setting, a language setting, a units setting, an avatar setting, a mirror position setting, a steering wheel setting, a radio setting, a heat ventilation air conditioning (HVAC) system setting, and a previous destination setting.

12. The system of claim 10, wherein the non-functional aspect of the rental vehicle comprises at least one of the following: an image setting, a playlist setting, a preferred music setting, a schedule setting, an action item setting, a news setting, and a way-point setting.

13. The system of claim 10, wherein the logic further causes the system to perform at least the following:
receive data related to an in-vehicle option from the rental vehicle; and
store the data in the system.

14. A system for communicating with a vehicle user comprising:
a processor; and
a memory component that stores logic that, when executed by the processor, causes the system to perform at least the following:
obtain a user preference and authorization information relating to a mobile phone device and third party information, the mobile phone device being authorized by a vehicle computing device of a vehicle and identifying a particular user;
recognize a vehicle access device carried by the particular user;
in response to recognizing the vehicle access device, providing access to the vehicle;
recognize the particular user upon approach with the mobile phone device;
implement the user preference for the particular user, the user preference comprising a setting for a functional aspect of the vehicle and a setting for a non-functional aspect of the vehicle, wherein the setting for the non-functional aspect includes user calendar integration to communicate user calendar events of a remotely stored user calendar to the vehicle, wherein implementing the user preference comprises determining an upcoming event on the user calendar is associated with an accessory; and
provide, by the vehicle computing device, customized interactive communication with the particular user, based on stored user preferences, the remotely stored user calendar, and third party information.

15. The system of claim 14, wherein the logic further causes the system to perform at least the following:
recognizing a second user upon approach with a second mobile phone device, the second mobile phone device being authorized by the vehicle computing device and identifying the second user;
implementing the user preference for the particular user;
determining which of the particular user and the second user is a driver of the vehicle,
wherein in response to determining that the particular user is the driver, the user preference is implemented, and
wherein in response to determining that the second user is the driver, implementing a user preference of the second user.

16. The system of claim 14, wherein the functional aspect of the vehicle comprises at least one of the following: a seat position setting, a language setting, a units setting, an avatar setting, a mirror position setting, a steering wheel setting, a radio setting, a heat ventilation air conditioning (HVAC) system setting, and a previous destination setting.

17. The system of claim 14, wherein the non-functional aspect of the vehicle further comprises at least one of the following: an image setting, a playlist setting, a preferred music setting, an action item setting, a news setting, and a way-point setting.

18. The system of claim 14, wherein the logic further causes the system to receive a request for access to the vehicle from a vehicle access device, wherein in response to receiving the request for access to the vehicle and recognizing the particular user, the user preference is implemented.

19. The system of claim 14, wherein the vehicle is a rental vehicle and wherein the user preference is obtained from a remote computing device.

20. The system of claim 14, wherein the user preference is stored on at least one of the following: the vehicle computing device, on the mobile phone device, and on a remote computing device.

* * * * *